US012619482B2

(12) United States Patent
Mansoor et al.

(10) Patent No.: US 12,619,482 B2
(45) Date of Patent: May 5, 2026

(54) SPATIAL COMPUTING

(71) Applicant: Hadean Supercomputing Ltd, London (GB)

(72) Inventors: Rashid Mohamed Mansoor, London (GB); James Kay, London (GB); Christopher Sinclair, London (GB); Francis Russell, London (GB); Ava Gordon, London (GB)

(73) Assignee: HADEAN SUPERCOMPUTING LTD, London (GB)

( * ) Notice: Subject to any disclaimer, the term of this patent is extended or adjusted under 35 U.S.C. 154(b) by 602 days.

(21) Appl. No.: 18/012,881

(22) PCT Filed: Jul. 1, 2021

(86) PCT No.: PCT/EP2021/068247
§ 371 (c)(1),
(2) Date: Dec. 23, 2022

(87) PCT Pub. No.: WO2022/003129
PCT Pub. Date: Jan. 6, 2022

(65) Prior Publication Data
US 2023/0267020 A1 Aug. 24, 2023

(30) Foreign Application Priority Data
Jul. 1, 2020 (EP) ..................................... 20183569

(51) Int. Cl.
*G06F 9/44* (2018.01)
*G06F 9/54* (2006.01)

(52) U.S. Cl.
CPC ................................... *G06F 9/546* (2013.01)

(58) Field of Classification Search
CPC ....................................................... G06F 9/546
USPC ......................................................... 719/313
See application file for complete search history.

(56) References Cited

U.S. PATENT DOCUMENTS

2015/0331964 A1 11/2015 Hobro

OTHER PUBLICATIONS

Garcia-Luna-Aceves, J.J., "Distributed Routing Using Internodal Coordination," Computer Networking Symposium Proceedings of the Washington, D.C. USA, Information Sciences and Technology Center, SRI International, pp. 412-421 (1988).

(Continued)

*Primary Examiner* — Timothy A Mudrick
(74) *Attorney, Agent, or Firm* — Hamilton, Brook, Smith & Reynolds, P.C.

(57) ABSTRACT

There is provided a computer-implemented method of communication between a plurality of processes, each process being responsible for a region of a space, and each process maintaining a routing tree, each node of the routing tree representing a respective one of the plurality of processes and containing an indication of the represented process and an indication of an associated region for which the represented process is responsible. The method comprises: receiving, by a first process, a message addressed to a target region of the space; determining, by the first process and using the routing tree of the first process, a set of subregions of the target region and associated processes; and for each of the determined subregions in the set, sending the message from the first process to the process associated with the determined subregion in the set.

18 Claims, 11 Drawing Sheets

(56)        References Cited

OTHER PUBLICATIONS

Substantive European Search Report, Result of Telephone Consultation, for EP 20 183 569.1, date of report: Nov. 19, 2021.
Communication Pursuant to Article 94(3) EPC for EP 20 183 569.1, date of report: Jun. 22, 2021.
European Search Report for EP 20 183 569.1, date of report: Dec. 21, 2020.
Intention to Grant for EP 20 183 569.1, date of report: Mar. 7, 2022.
International Preliminary Report on Patentability for PCT/EP2021/068247, date of report: Dec. 13, 2022.
Heutelbeck, D., "Distributed Space Partitioning Trees and their Application in Mobile Computing, Mathematik und Informatik," (May 1, 2005).
International Search Report and Written Opinion for PCT/EP2021/068247, dated Sep. 7, 2021.
European Search Report for EP 23176311.1, entitled: Spatial Computing, dated Nov. 2, 2023 (9 pages).

SPATIAL COMPUTING

This application is the U.S. National Stage of International Application No. PCT/EP2021/068247, filed Jul. 1, 2021, which designates the U.S., published in English, and claims priority under 35 U.S.C. § 119 or 365 (c) to European Application No. 20183569.1, filed Jul. 1, 2020. The entire teachings of the above applications are incorporated herein by reference.

FIELD

The present disclosure relates to a method of communication for use in spatial computing. In particular, the disclosure relates to a method of communication between processes which are each responsible for a region of space.

BACKGROUND

Spatial computation on a metric space can easily grow in complexity to the point where it is not possible for the computation to be performed by a single processor without exceeding a reasonable time bound or the amount of memory addressable by a single processor, requiring either a distributed cluster of processors or dedicated custom hardware. In order to use a cluster of processors, a distributed data structure that supports spatial computation is called for.

SUMMARY

Aspects of the present disclosure are defined in the accompanying independent claims.

OVERVIEW OF DISCLOSURE

There is provided a computer-implemented method of communication between a plurality of processes, each process being responsible for a region of a space, and each process maintaining a routing tree, each node of the routing tree representing a respective one of the plurality of processes and containing an indication of the represented process and an indication of an associated region for which the represented process is responsible, the method comprising:

a) receiving, by a first process, a message addressed to a target region of the space;

b) determining, by the first process and using the routing tree of the first process, a set of subregions of the target region and processes associated with the subregions; and c) for each of the determined subregions in the set, sending the message from the first process to the process associated with the determined subregion in the set.

Optionally, wherein the subregions in the set are disjoint. In this way, the message is sent to each part of the target region at most once.

Optionally, wherein the subregions in the set cumulatively cover the target region. In this way, the message is sent to each part of the target region at least once.

Optionally, wherein the determining comprises traversing the routing tree of the first process, the traversing comprising, for each of a plurality of traversed nodes in the routing tree:

determining a subregion based on (at least) the region associated with the traversed node in the routing tree, and adding, to the set, the subregion and the process associated with the Optionally, wherein the traversing is performed until the subregions in the set cumulatively cover the target region.

Optionally, wherein the subregion is based on (at least) an overlap between the target region and the region associated with the traversed node in the routing tree.

Optionally, wherein the adding is performed responsive to determining that the target region and the region associated with the traversed node in the routing tree overlap.

Optionally, wherein the determining comprises traversing the routing tree of the first process, the traversing comprising, for each of a plurality of traversed nodes in the routing tree:

if the traversed node has one or more children in the routing tree, determining whether, after subtracting the regions associated with each of the one or more children in the routing tree, the target region and the region associated with the traversed node in the routing tree overlap in an overlap region, otherwise, determining whether the target region and the region associated with the traversed node in the routing tree overlap in an overlap region, and responsive to determining that the target region and the region associated with the traversed node in the routing tree overlap, adding, to the set, the overlap region and the process associated with the traversed node in the routing tree.

Optionally, wherein the traversing is performed in breadth-first order.

Optionally, wherein the traversing is performed in depth-first order.

Optionally, wherein the traversing comprises, for each of a plurality of traversed nodes in the routing tree:

determining whether the target region and the region associated with the traversed node in the routing tree overlap; and responsive to determining that the target region and the region associated with the traversed node in the routing tree do not overlap, refraining from traversing any child nodes of the traversed node in the routing tree.

Optionally, wherein the determining comprises traversing the routing tree of the first process until the subregions in the set cumulatively cover the target region, the traversing comprising, for each of a plurality of traversed nodes in the routing tree:

determining whether the target region and the region associated with the traversed node in the routing tree overlap in a first overlap region;

responsive to determining that the target region and the region associated with the traversed node in the routing tree do not overlap: refraining from traversing any child nodes of the traversed node in the routing tree; and responsive to determining that the target region and the region associated with the traversed node in the routing tree overlap:

if the traversed node has no children in the routing tree, adding, to the set, the first overlap region and the process associated with the traversed node in the routing tree; and otherwise, if the traversed node has one or more children in the routing tree:

determining whether, after subtracting the regions associated with each of the one or more children in the routing tree, the target region and the region associated with the traversed node in the routing tree overlap in a second overlap region, and

adding, to the set, the second overlap region and the process associated with the traversed node in the routing tree.

Optionally, further comprising, for each of the determined subregions in the set, determining whether a failure has been detected in transporting the message to the process associated with the determined subregion.

Optionally, wherein determining that a failure has been detected in transporting the message to the process associated with the determined subregion comprises determining whether the message has been acknowledged.

Optionally, further comprising, for each of the determined subregions in the set, responsive to determining that a failure has been detected in transporting the message to the process associated with the determined subregion, removing the node associated with the determined subregion from the routing tree.

Optionally, further comprising, d) for each of the determined subregions in the set, responsive to determining that no failure has been detected in transporting the message to the process associated with the determined subregion, subtracting the determined subregion from the target region.

Optionally, further comprising, d) for each of the determined subregions in the set, subtracting the determined subregion from the target region.

Optionally, further comprising, repeating steps b), c) and d) until the target region is empty.

Optionally, wherein the target region and the region associated with the first process do not overlap.

Optionally, further comprising, prior to step b):

determining whether the target region and the region associated with the first process overlap; and responsive to determining that the target region and the region associated with the first process do not overlap, ceasing processing of the message, wherein step b) is performed responsive to determining that the target region and the region associated with the first process overlap.

Optionally, further comprising, determining whether the target region and the region associated with the first process overlap; and responsive to determining that the target region and the region associated with the first process do not overlap, sending a reply to the other process indicating that the message addressed to the target region has not been delivered, wherein step b) is performed responsive to determining that the target region and the region associated with the first process overlap.

Optionally, wherein the message addressed to the target region is received from another process.

Optionally, wherein sending the message to the process associated with the determined subregion comprises:

altering the message according to the determined subregion; and sending the altered message to the process associated with the determined subregion.

Optionally, wherein the altering comprises removing a portion of the message according to the determined subregion.

Optionally, wherein the first process is represented by a first node in the routing tree of the first process, the method further comprising:

determining, by the first process, that the first process is overloaded; and responsive to determining that the first process is overloaded:

partitioning at least a portion of the region for which the first process is responsible into a plurality of disjoint subregions;

creating, by the first process, a plurality of child processes of the first process each responsible for a respective one of the plurality of disjoint subregions;

adding, to the routing tree of the first process, a plurality of child nodes of the first node, each of the child nodes containing an indication of one of the child processes and an indication of a corresponding one of the plurality of disjoint subregions for which the one of the child processes is responsible.

Optionally, further comprising communicating, by the first process to at least one other process, an indication that the plurality of child processes have been created by the first process and an indication of the plurality of disjoint subregions for which the plurality of child processes are responsible.

Optionally, further comprising adding, to a global database accessible by other processes, an indication that the plurality of child processes have been created by the first process and an indication of the plurality of disjoint subregions for which the plurality of child processes are responsible.

Optionally, further comprising:

receiving, by the first process, an indication that at least one child process of the first process is underloaded; and responsive to the receiving of the indication that the at least one child process of the first process is underloaded:

sending a termination signal to the at least one child process, and removing, from the routing tree of the first process, the at least one child node representing the at least one child process.

Optionally, further comprising communicating, by the first process and to at least one other process, an indication that the at least one child process has been terminated.

Optionally, further comprising removing, by the first process from a global database accessible by other processes, an entry for each of the at least one child processes.

Optionally, further comprising, after sending the termination signal, receiving process data from the at least one child process.

Optionally, wherein the removing from the routing tree is responsive to receiving the process data.

Optionally, wherein the sending of step c) is performed concurrently for at least two determined subregions.

Optionally, wherein at least one of the nodes in the routing tree of the first process has a plurality of child nodes representing a respective plurality of child processes, the at least one node being responsible for a given region of the space, and wherein the associated regions for which the plurality of child processes are responsible are disjoint subregions of the given region.

Optionally, wherein the associated regions for which the plurality of child processes are responsible cumulatively cover (only) a portion of the given region.

Optionally, wherein a portion of the given region is not covered by any of the associated regions for which the plurality of child processes are responsible.

Optionally, wherein the regions of the space are obtained by recursively subdividing the space.

Optionally, wherein the space is a two-dimensional space partitioned into quadrants.

Optionally, wherein the space is of three or more dimensions lying on a two-dimensional plane partitioned into quadrants.

Optionally, wherein the space is a three-dimensional space partitioned into octants.

Optionally, wherein the routing tree of the first process is incomplete.

Optionally, wherein the target region and the indications of the associated regions in the routing tree of the first process are encoded using fixed-width coordinates on a space-filling curve.

Optionally, wherein the target region and the indications of the associated regions in the routing tree of the first process are encoded using a Morton code.

There is provided a computer program comprising instructions which, when executed by one or more computers, cause the one or more computers to perform any of the methods described herein.

There is provided a computer-readable medium comprising the computer program. Optionally, the computer-readable medium is non-transitory.

There is provided a computer system configured to perform any of the methods described herein.

Optionally, the computer system comprises the computer-readable medium and one or more processors configured to execute the computer program.

Optionally, the computer system comprises circuitry configured to perform any of the methods described herein.

The 'sending' of a message does not require that the message necessarily arrive at its destination, or even that the message leave the device that is running the first process. Instead, the sending of a message may merely comprise providing the message to a transport mechanism with an indication of the process for which it is intended. If the message received in step a) is marked unreliable, the mechanism may, for example, choose to make a best effort at delivery, choose to drop the message to bound resource usage, or perform a passive send initiated by the receiving process, e.g., in the case of one-sided transfer by using local or remote shared memory.

BRIEF DESCRIPTION OF THE DRAWINGS

Examples of the present disclosure will now be explained with reference to the accompanying drawings in which.

Throughout the description and the drawings, like reference numerals refer to like parts.

DETAILED DESCRIPTION

Figure 1:
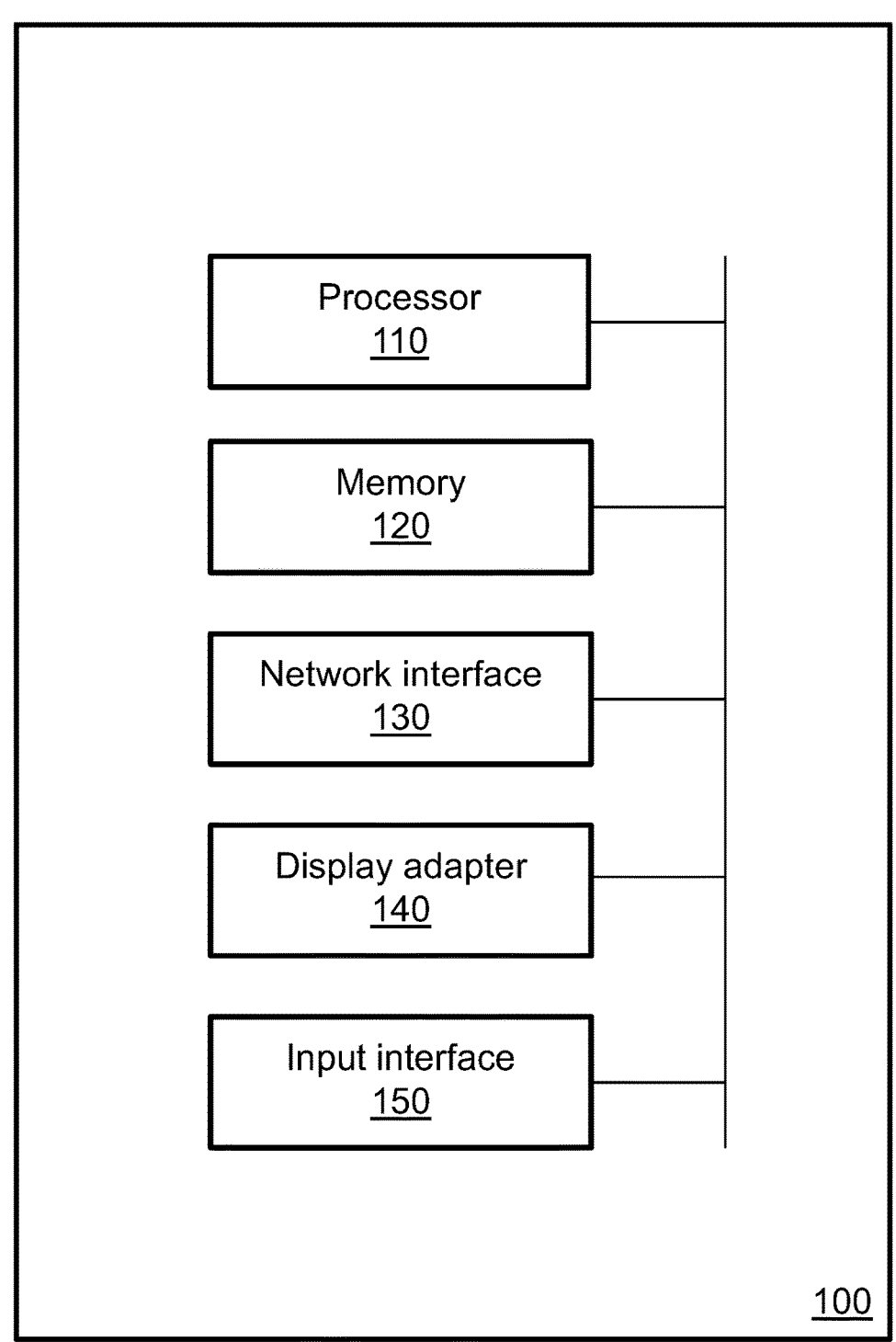
FIG. 1 shows an apparatus which can be used for implementing any of the methods described herein.

In general terms, the present disclosure relates to a method of communication between processes which are each responsible for a region of a space. The space is represented by a distributed spatial partitioning tree, and each process maintains its own imperfect representation of the distributed spatial partitioning tree, referred to as a routing tree, which may be incomplete and/or out-of-date. The method involves a process using its routing tree to determine how to route a message addressed to a target region.

Although there have been attempts to create distributed data structures for spatial simulation, such as SpatialOS, none of these have significantly improved the scale of possible computation. These attempts involved attempting to orchestrate non-distributed data structures to be able to support a distributed set of processors. The reconciliation of these non-distributed data structures is difficult, particularly at scale.

Other distributed data structures typically lack features required for spatial computation. For example, Spark and Hadoop support distributed computation, but do not facilitate computing on spatial data. Instead, these technologies typically partition data in advance and process each part separately from all others. There are also non-distributed data structures for spatial computation, notably k-d trees. These data structures can, with care, be extended to support concurrency, but traditional implementations cannot be distributed, and as such are always constrained to the available compute of a single processor.

Given the existing limitations, there is described herein various methods for use with a concurrent distributed data structure for spatial computation based on space partitioning, removing the previous limits on the possible scale of spatial computation. The approach allows for dynamic arbitrary partitions of a space that are dynamically distributable across many compute resources.

The method involves an efficient three-way mapping between a conceptual metric space, a distributed data structure, and a cluster of distributed processing units in such a way as to optimise communication and computation time required to model interactions (e.g., particle or field interactions) between spatially proximate regions.

The chief benefits of distributing such a computation are:

concurrency: computations on disjoint regions of space can be computed concurrently except where they interact, allowing a multiplicative speed-up in cases where their computation can proceed in parallel;

scalability: the space can be split into as many regions as hardware allows, permitting the computation of arbitrarily large regions or the computation of regions at arbitrarily detailed scales, as the storage and compute requirements can be split across many physically separated units;

dynamicity: the problem size need be neither known ahead of time nor fixed during the computation for any reason; it may even vary during the course of computation, with the distributed spatial partitioning tree growing or shrinking dynamically, and parts of the space with greater compute resource demands may be allocated resources according to said demand heterogeneously; and resiliency: regions of space can be computed redundantly or check-pointed in parallel, allowing for computation to proceed with fail-over or snapshot recovery behaviour in cases of hardware or software failure.

A key challenge of distributing a virtual space is to facilitate efficient communication between regions. To solve this perfectly—which is of course not actually necessary—would require finding the global optimum that meets the constraints and demands for region-region communication. The approaches herein approximate the optimal embedding of the virtual space onto the metric space formed by the graph of internetworked compute resources.

A particularly interesting use-case for the approaches described herein is arbitrary-scale or arbitrary-precision spatial computation. A distributed program can add or remove compute resources at will, up to the limitation of hardware available to attach; as such, a notionally continuous space represented via a distributed data structure as described herein can be approximated to an arbitrary degree of scale and precision, allowing the programmer to locally increase or decrease its resolution as necessary by employing an arbitrarily large amount of compute resources.

The approaches described herein can be used to solve spatial computing problems on general metric spaces ranging from games to physical simulations of the macroscopic real world to microscopic or subatomic interactions. It may also be used to solve abstract problems in applied mathematics and physics that are not physical systems but map to the mathematical concept of a metric or topological space—for example, to organise data for search and retrieval or computing sensor fusion in robotics to use distributed sensors that contribute to an understanding of some larger phenomenon being measured.

A block diagram of an exemplary apparatus 100 for implementing any of the methods described herein is shown in FIG. 1. The apparatus 100 comprises a processor 110 arranged to execute computer-readable instructions as may be provided to the apparatus 100 via one or more of a memory 120, a network interface 130, or an input interface 150.

The memory 120, for example a random-access memory (RAM), is arranged to be able to retrieve, store, and provide to the processor 110, instructions and data that have been stored in the memory 120. The network interface 130 is arranged to enable the processor 110 to communicate with a communications network, such as the Internet. The input interface 150 is arranged to receive user inputs provided via an input device (not shown) such as a mouse, a keyboard, or a touchscreen. The processor 110 may further be coupled to a display adapter 140, which is in turn coupled to a display device (not shown).

Figure 2:
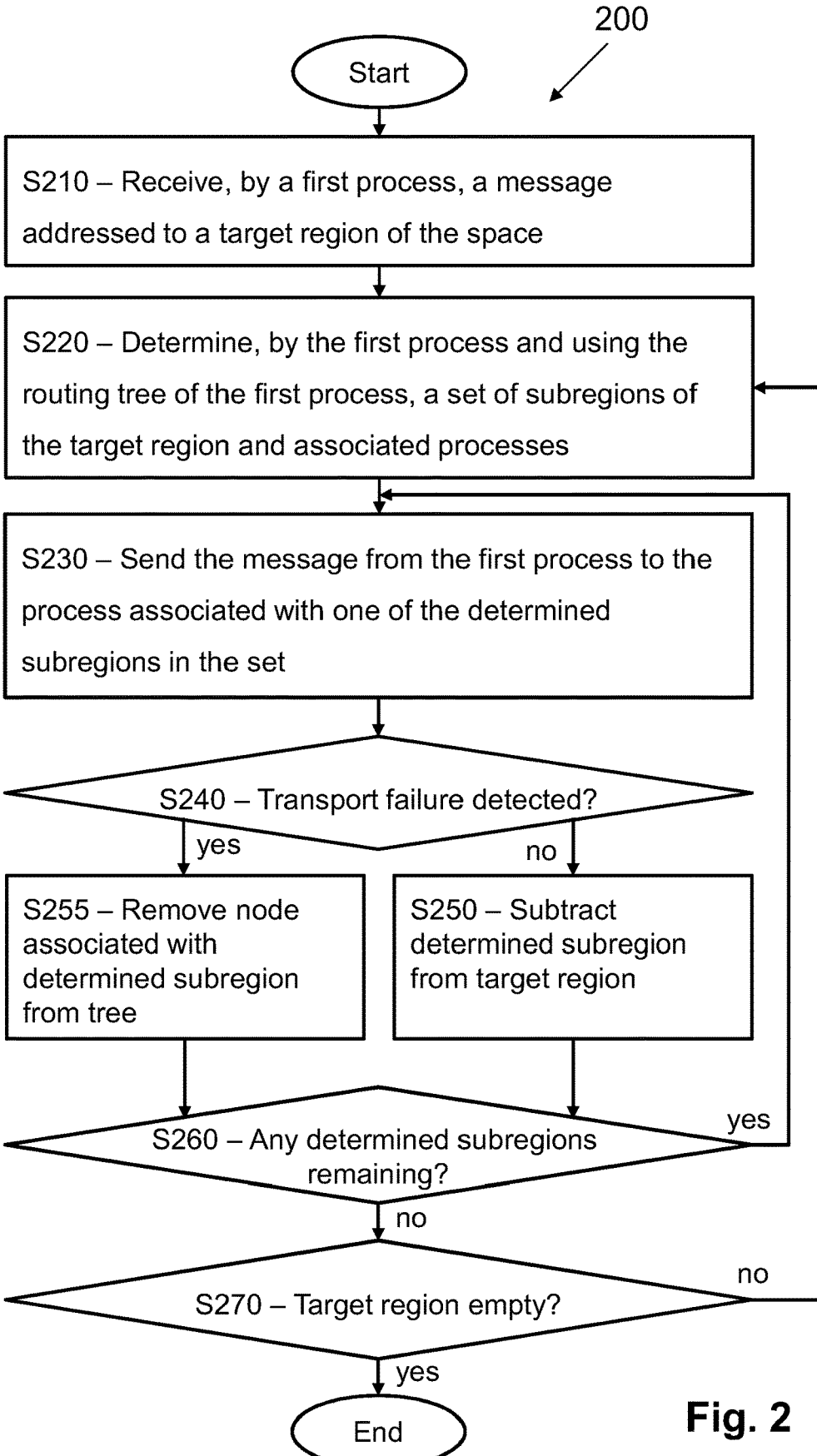
FIG. 2 shows a flow-chart of a method of communication between processes.

The method of communication 200 of the present disclosure is now described in general terms, with reference to FIG. 2.

This method is used to enable communication between processes (or 'workers'). Each process is responsible for a region of a space R, and each process maintains a routing tree.

The space may, for example, be a two-dimensional space partitioned into quadrants, a three-dimensional space partitioned into octants, or a space of three or more dimensions lying on a two-dimensional plane partitioned into quadrants. The regions of the space may be obtained by recursively subdividing the space.

Each node of the routing tree represents a respective one of the processes, and contains:

an indication of the represented process; and an indication of an associated region for which the represented process is responsible.

For example, a node representing process $W[r_X]$ which is responsible for a region $r_X$ of the space R may contain a pair $(r_X, W[r_X])$.

The indication of the represented process may be any indication that allows a message to be addressed to the process. For example, the indication may be a socket address, or a process identifier.

The indication of the region may be a set of parameters that define the region, such as a set of coordinates of vertex points of a mesh or, if the space is partitioned into cuboids, a set of coordinates of the vertices of the cuboid in a predetermined order. The indication may be encoded using fixed-width coordinates on a space-filling curve, e.g., using a Morton code.

Although the routing trees maintained by each of the processes will have nodes in common (e.g., at least a root node), the routing trees are likely to differ, since the routing tree maintained by a particular process is likely to be missing some nodes, and may also be out-of-date (e.g., due to split or merge operations of which the process has not yet been informed, as described below).

The method is performed by one of the processes, referred to as a 'first process'. This process communicates with other processes, which may in turn also perform this method.

In this method, the target region is taken by value and modifications to the target region made in this method (in particular, in step S250) therefore do not affect the target region once the method has been completed. This allows the method to dynamically update the target region to keep track of the portions of the target region to which the message has been sent. The routing tree is, however, taken by reference, so that changes to the routing tree made in this method (in particular, in step S255) are preserved once the method has been completed.

In step S210, the first process receives a message addressed to a target region of the space R. The message may be received from another process, or may originate with the first process. The target region need not be a continuous region, and could include a number of disjoint subregions.

Where the message is received from another process, the first process may determine whether the target region and the region associated with the first process in the routing tree overlap. Responsive to determining that the target region and the region associated with the first process in the routing tree do not overlap, the first process may cease processing of the message, or send a reply to the other process indicating that the message addressed to the target region has not been delivered. Responsive to determining that the target region and the region associated with the first process in the routing tree do overlap, the first process may continue to step S220. Alternatively, this step may be omitted, and the first process may (altruistically) process a message even if that message should not have been sent to the first process in the first place.

The message may comprise a field indicating the target region to which it is addressed, and a payload comprising the message to be delivered to that target region.

In step S220, the first process determines, using the routing tree of the first process, a set of subregions of the target region and processes associated with the subregions. In other words, the first process decomposes the target region into a set of subregions, and includes the associated processes in the set. Approaches for performing this decomposition are set out in more detail in FIGS. 4 and 5, although a general description is provided here.

In particular, the first process may traverse (or 'walk') the routing tree of the first process until the subregions in the set cumulatively cover the target region. For each traversed node (which need not be all nodes of the routing tree), the first process may determine a subregion based on (at least) the region associated with the traversed node in the routing tree, and add, to the set, the subregion and the process associated with the traversed node in the routing tree. In particular, the subregion may be based on (at least) an overlap between the target region and the region associated with the traversed node in the routing tree, and the adding may be performed responsive to determining that the target region and the region associated with the traversed node in the routing tree overlap. In this way, the message is sent only to the nodes which are responsible for at least a portion of the target region. This approach may, however, result in duplicate messages being sent, e.g., to both a node and its children. Approaches which additionally take into account the region(s) associated with the child(ren) of a traversed node, as presented below, can avoid such duplication.

The way in which the subregion is determined will depend on the order in which the nodes of the routing tree of the first process are traversed. The nodes may be traversed in any order; for example, depth-first or breadth-first, or pseudo-random.

In one approach, for each traversed node:

if the traversed node has one or more children in the routing tree (in other words, if the traversed node is a branch node), the first process determines whether, after subtracting the regions associated with each of the one or more children in the routing tree, the target region and the region associated with the traversed node in the routing tree overlap in an overlap region, otherwise (in other words, if the traversed node is a leaf node), the first process determines whether the target region and the region associated with the traversed node in the routing tree overlap in an overlap region, and responsive to determining that the target region and the region associated with the traversed node in the routing tree overlap, the first process adds, to the set, the overlap region and the process associated with the traversed node in the routing tree.

In order to avoid traversing nodes unnecessarily, the first process may, for each of a plurality of traversed nodes, determine whether the target region and the region associated with the traversed node in the routing tree overlap. In response to determining that the target region and the region associated with the traversed node in the routing tree do not overlap, the first process may refrain from traversing any child nodes of the traversed node in the routing tree, e.g., by marking those child nodes as not to be traversed, or by not marking those child nodes as nodes to be traversed. In response to determining that the target region and the region associated with the traversed node in the routing tree do overlap, the first process may continue performing the steps set out above.

In summary, therefore, for each of a plurality of traversed nodes in the routing tree, the first process may:

determine whether the target region and the region associated with the traversed node in the routing tree overlap in a first overlap region;

responsive to determining that the target region and the region associated with the traversed node in the routing tree do not overlap: refrain from traversing any child nodes of the traversed node in the routing tree; and responsive to determining that the target region and the region associated with the traversed node in the routing tree do overlap:

if the traversed node has no children in the routing tree, add, to the set, the first overlap region and the process associated with the traversed node in the routing tree; and otherwise, if the traversed node has one or more children in the routing tree:

determine whether, after subtracting the regions associated with each of the one or more children in the routing tree, the target region and the region associated with the traversed node in the routing tree overlap in a second overlap region, and add, to the set, the second overlap region and the process associated with the traversed node in the routing tree.

In step S230, the first process sends the message to the process associated with one of the determined subregions in the set. The first process can mark that determined subregion as having been processed, or can simply remove it from the set.

Before sending, the message may be altered according to the determined subregion. For example, a portion of the message may be removed according to the determined subregion. In this way, portions of the message which are not relevant to a particular subregion/process need not be sent to that subregion/process.

In step S240, the first process may determine whether a failure has been detected in transporting the message sent in step S230. For example, the first process may determine whether the message has been acknowledged, the first process may determine whether the message has been rejected, or the first process may determine whether its transport mechanism has reported that the message could not be transported (e.g., because the indication of the process associated with the determined subregion cannot be resolved). Alternatively, step S240 can be omitted, and the first process can assume that no failure has occurred in transporting the message. A failure in transporting the message may indicate that the routing tree of the first process is out-of-date.

In step S250, responsive to determining that no failure was detected in transporting the message, the first process subtracts the determined subregion from the target region. In this way, the first process is able to keep track of the subregions of the target region to which the message remains to be sent.

In step S255, responsive to determining that a failure was detected in transporting the message, rather than subtracting the determined subregion from the target region, the first process removes the node associated with the determined subregion from the routing tree. In this way, the first process avoids resending the message to the same, apparently incorrect, process.

In step S260, the first process determines whether any subregions remain in the set (or whether any subregions which have not been marked as having been processed remain in the set). These are subregions to which the message has not yet been sent. Responsive to determining that there is at least one such subregion, the first process returns to step S230, and the message is sent to another one of the subregions remaining in the set.

In step S270, responsive to determining that no subregions remain in the set or no subregions which have not been marked as having been processed remain in the set (i.e., the message has been sent to each of the subregions in the set), the first process determines whether the target region is empty. If the target region is empty, this indicates that no failure has been detected in transporting the message to any part of the target region, or equivalently, because the sub-regions in the set cumulatively cover the target region, no failure has been detected in transporting the message to any of the subregions in the set. If the target region is not empty, this indicates that a failure has occurred in transporting the message to at least a portion of the target region.

Responsive to determining that the target region is empty, the method 200 may end. Responsive to determining that the target region is not empty, the first process may return to step S220. However, this time, the routing tree contains fewer nodes. Thus, when the determining of step S220 is repeated, the determined subregions should be different. For example, if the first process is unable to determine a suitable process to handle the message, the first process may include the root node in the set, and send the message to the root process.

The method may also comprise the first process performing a split or merge operation. This allows the first process to adapt to changing computational needs in different parts of the space.

Thus, in the case of a split operation, the method may comprise determining, by the first process, that the first process is overloaded and, responsive to determining that the first process is overloaded:

partitioning at least a portion of the region for which the first process is responsible into a plurality of disjoint subregions;

creating, by the first process, a plurality of child processes of the first process each responsible for a respective one of the plurality of disjoint subregions;

adding, to the routing tree of the first process, a plurality of child nodes of a first node representing the first process in the routing tree, each of the child nodes containing an indication of one of the child processes and an indication of a corresponding one of the plurality of disjoint subregions for which the one of the child processes is responsible.

The first process may also communicate, to at least one other process, an indication that the plurality of child processes have been created by the first process and an indication of the plurality of disjoint subregions for which the plurality of child processes are responsible. In this way, those other processes may update their own routing trees. Additionally or alternatively, the first process may add, to a global database accessible by other processes, an indication that the plurality of child processes have been created by the first process and an indication of the plurality of disjoint subregions for which the plurality of child processes are responsible.

In the case of a merge operation, the method may further comprise receiving, by the first process, an indication that at least one child process of the first process is underloaded and, responsive to the receiving of the indication that the at least one child process of the first process is underloaded:

sending a termination signal to the at least one child process, and removing, from the routing tree of the first process, the at least one child node representing the at least one child process.

The first process may also communicate, to at least one other process, an indication that the at least one child process has been terminated. In this way, those other processes may update their own routing trees. Additionally or alternatively, the first process may remove, from a global database accessible by other processes (e.g., the global database used in the split operation), an entry for each of the at least one child processes. After sending the termination signal, the first process may receive process data from the at least one child process. The removing from the routing tree may optionally be responsive to receiving the process data. In this way, the child nodes are not removed from the routing tree until the corresponding processes have provided relevant information back to the first process which the first process may need in order to take over their functions.

There now follows a more detailed description of the approach set out in FIG. 2, along with the theory that motivates this approach. It will be understood that the steps that follow may be added to, or replace, those described above.

The headings that follow are provided purely for readability and should not be construed as limiting.

Definitions

Spatial partitioning (SP): repeated subdivision of a metric space into regions. The subdivision may be binary. Can be represented as a tree, which facilitates an efficient lookup operation for spatial data close to a point. Variations on this method make different trade-offs between the cost of the lookup operation and the cost of keeping the relevant data structures updated.

Concurrent SP: SP in which regions can be computed on concurrently: each region of space has its own notional thread of control, which may proceed out-of-order with respect to one another.

Distributed concurrent SP: concurrent SP in which regions can only communicate via a lossy link (transmission delays/failures).

Region: a subset of the space.

Distributed tree: a distributed variant of the classic tree structure in which the data may be spread across multiple processes and retrieved across communication links.

Distributed spatial partitioning tree (DSPT): a distributed tree representing a spatial partitioning.

Worker: a (possibly distributed) computational process that participates in the DSPT (acts as a node of the DSPT) by being responsible for a certain region of space. Workers may be branches (nodes with children) or leaves (nodes with no children) of the DSPT.

Routing tree: a (local) data structure that (usually imperfectly) represents a DSPT. Each node of the tree represents one of the workers, and contains an indication of the represented process and an indication of the associated region.

Root: The (unique) worker whose assigned region is the entire space.

Model

The basic model exposed to the user is that of a continuous space and a message-passing interface to send messages to regions of that space.

Regions

The space has an associated type of regions R. No particular representation of regions is committed to, but certain operations are available. Specifically, R is closed under 'union' and 'intersection' operations each forming a commutative monoid over R (denoted $(\cup, \perp)$ and $(\cap, \top)$ respectively) and supports subtraction (denoted $r_1 \backslash r_2$) such that $(r_1 \backslash r_2) \cap r_2 = \perp$ for all $r_1$, $r_2$.

That is to say:

Any pair of regions should support the ability to be combined with a 'union' or 'intersection' operation whose result is another region.

The union of regions $r_1$ and $r_2$ is written as $r_1 \cup r_2$, and the intersection of regions $r_1$ and $r_2$ as $r_1 \cap r_2$. The intersection of regions $r_1$ and $r_2$ can be referred to as the 'overlap' between regions $r_1$ and $r_2$.

There should be a 'null region' $\perp$ that represents none of the space, and taking the union of the empty region with any region should give a region equal to the original region.

There should be a 'universal region' T that represents all of the space, and taking the intersection of the universal region with any region should give a region equal to the original region.

Taking the union or intersection of any two regions should yield an equal result no matter the order of the regions supplied (i.e., $r_1 \cup r_2$ should be equal to $r_1 \cup r_2$, and $r_1 \cap r_2$ should be equal to $r_2 \cap r_1$).

Regions should support a subtraction operation, which is written as $r_1 \backslash r_2$, that selects the region $r_1$ with the region $r_2$ excluded.

When two regions are said to be equal, it is meant that they represent the same subsets of the space, though their internal representations in the language of regions may vary.

Messages

Messages can be addressed to regions; a message m addressed to a region r will be written as $m\langle r \rangle$. As an optimization, the user may have the ability to provide some code that alters the message m when it is readdressed to a new region, for example, to strip out information that is irrelevant to that region.

Messages can be reliable or unreliable. Reliable messages are guaranteed to (eventually) be delivered to a worker responsible for its destination region, barring catastrophic failure; unreliable messages are delivered on a best-effort basis. Unreliable messages may be implemented using an unreliable mechanism (e.g., User Datagram Protocol, UDP), or may be deliberately dropped internally in cases where delivery proves expensive or unnecessary.

Workers

The space is partitioned into a (spatial partitioning) tree, and nodes of the tree are assigned to workers. Each worker has an associated region, and runs user code that is responsible for managing the computation that applies to that region. Workers may delegate responsibility for part of the region to a child worker or child workers. Initially, the entire space is managed by a single worker (known as the 'root' worker).

Assumptions

It is assumed there is a basic underlying layer for creating new (potentially remote) processes and communicating messages between them. No commitment is made to the specific mechanism for passing messages; some reasonable implementations might include Transmission Control Protocol (TCP), User Datagram Protocol (UDP), or something more exotic (like Azure message queues or transfer of ownership on some shared external storage).

Tree Structure

The distributed spatial partitioning tree comprises a distributed tree structure mapping regions to workers. Each worker also contains a potentially imperfect (incomplete or out of date) representation of the whole distributed spatial partitioning tree, called the routing tree.

The routing tree structure is a variant of a max-heap, rooted at T, in which the order is given by region inclusion (which can be derived from intersection: $r_1 \leq r_2 \Leftrightarrow r_1 \cap r_2 = r_1$). Every worker's routing tree should always have fresh entries for the root node and the worker's parent and direct children. This is possible because:

a worker is not reparented, so the parent entry it starts with is always fresh;

inductively, the root entry is always fresh;

a worker has authority over its direct children, so merely needs to update its routing tree atomically with respect to message routing when they change.

Any other information may be missing or stale, and acts merely as a caching optimization to avoid unnecessary tree traversals. One interesting case is where, perhaps due to stale information in the routing tree, the process ends up sending a message to the wrong node, i.e., a node whose region does not contain the target region of the message. In this case, the receiving node may drop the message, reporting a failure to the sending node, which can try again; however, the receiving node could also choose to report a success to the sending node and take ownership of the message, sending it on using its own routing tree.

The routing tree is updated at runtime by an unspecified mechanism; some possible mechanisms include:

eager broadcast to some set of nodes as soon as the tree structure changes;

updating the requesting worker on cache miss; or background peer-to-peer updates (e.g. a gossip protocol).

Message Passing

On sending a message, a worker will consult its local copy of the tree and attempt to split up the message and route it to the most specific set of workers (the workers lowest down the tree that cover the message) it can.

Message Send

Figure 3:
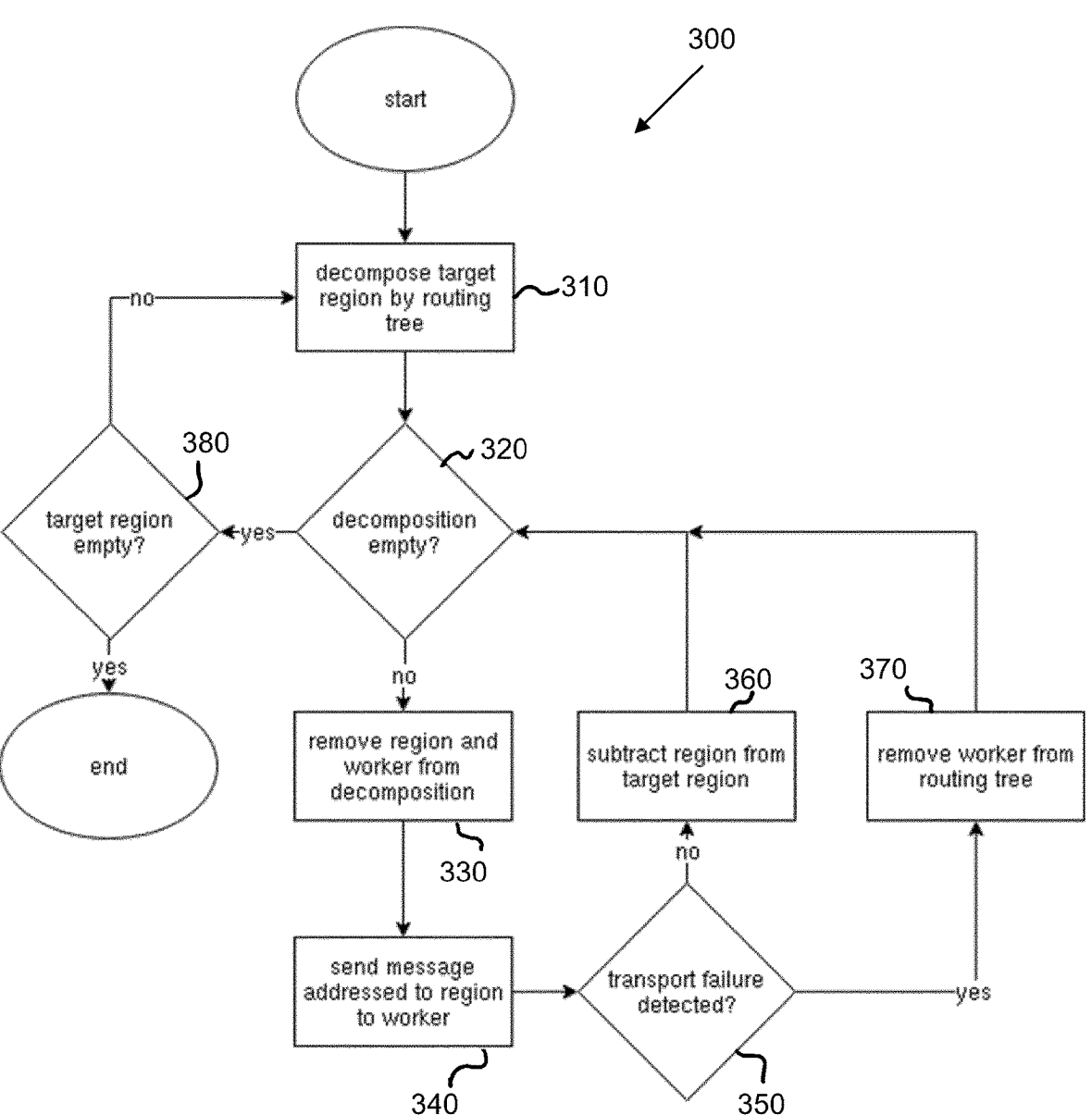
FIG. 3 shows a flow-chart of another method of communication between processes.

A top-level method 300 used to send a message to a region is shown in FIG. 3. It is followed by the worker that originally wishes to send the message, as well as any workers that may receive the message but that are not the worker ultimately responsible for the message's region. The depiction here is sequential, but in practice one would expect the sends of this method (step 340) to be performed concurrently and the results collected, as it benefits significantly from performing the input/output operations asynchronously.

As in the method 200, in this method, the target region is taken by value and modifications to the target region made in this method (in particular, in step 360) therefore do not affect the target region once the method has been completed. The routing tree is, however, taken by reference, so that changes to the routing tree made in this method (in particular, in step 370) are preserved once the method has been completed.

In step 310, the target region is decomposed by the worker using the worker's routing tree to produce a decomposition set of regions and associated workers. A detailed explanation of this decomposition will follow, with reference to FIGS. 4 and 5.

In step 320, the worker determines whether the decomposition is empty. If the decomposition set is empty, the method moves to step 330. If the decomposition set is not empty, the method moves to step 380.

In step 330, if the decomposition set is not empty, the worker removes (or 'takes') a region and associated worker from the decomposition set.

In step 340, the worker sends the message to the associated worker removed from the decomposition set, addressed to the region removed from the decomposition set.

In step 350, the worker determines whether the message was successfully sent.

In step 360, if the message was successfully sent, the worker subtracts the region removed from the decomposition set from the target region. The method then returns to step 320.

In step 370, if the message was not successfully sent, the worker removes, from the routing tree, the worker that was removed from the decomposition set, and the method then returns to step 320.

In step 380, if the decomposition set is empty, the worker determines whether the target region is empty. If the target region is empty, the method ends. If the target region is not empty, the method returns to step 310.

Region Decomposition

Figure 4:
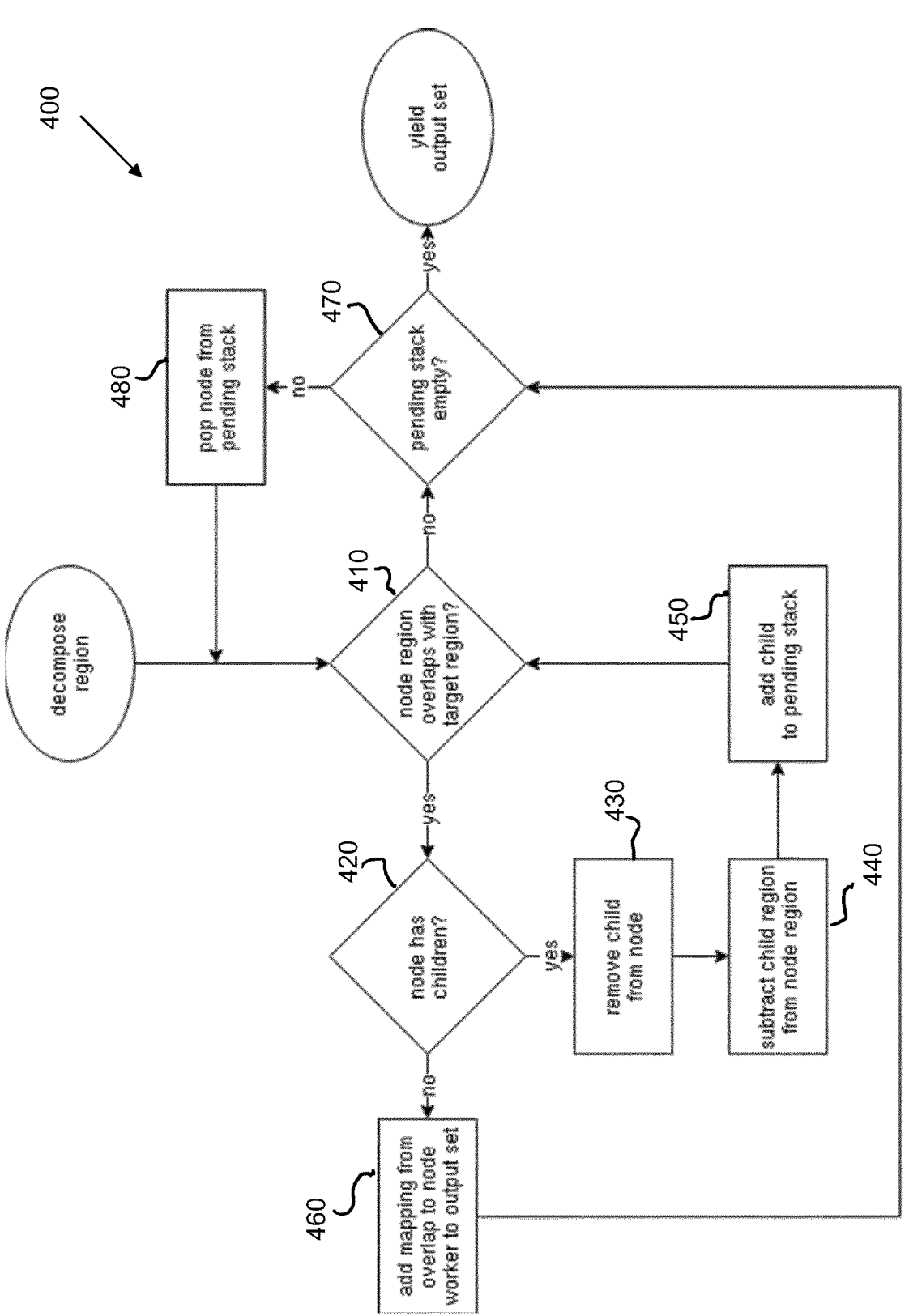
FIG. 4 shows a flow-chart of a method of determining subregions of a target region which can be used with the methods of FIGS. 2 and 3.
Figure 5:
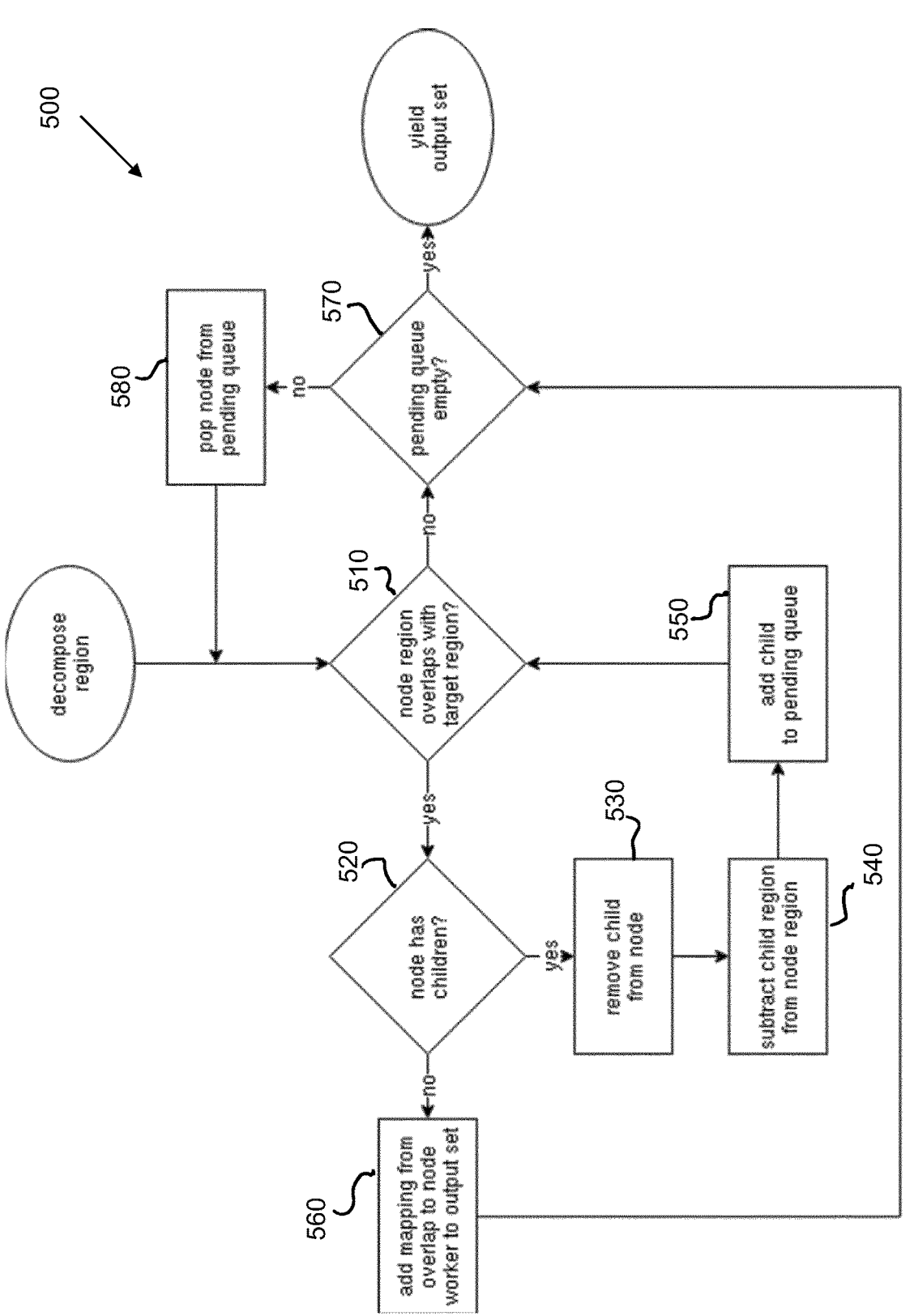
FIG. 5 shows a flow-chart of another method of determining subregions of a target region which can be used with the methods of FIGS. 2 and 3.

Implementations of the procedure to decompose a region according to a routing tree are shown in FIGS. 4 and 5. Essentially, for each node in the tree, the regions of all the node's children are subtracted from the node's region, ensuring that no region is messaged twice, and if the result is non-empty then a mapping from the remaining region to the node's worker is yielded.

The actual order of the traversal does not matter, which leads to some optimizations:

If parents are traversed before their children, some work can be avoided by immediately discarding nodes that have no overlap with the target region.

Siblings in the tree are known to be disjoint, so can be processed in parallel.

If the region and tree are encoded using fixed-width coordinates on a space-filling curve, such as Morton codes (in the case of a binary partitioning of the space), partitioning of the region can be performed in linear time by simply performing a filtering directly on the coordinates.

For illustration, flowcharts of a depth-first traversal (FIG. 4) and also a breadth-first traversal (FIG. 5) are provided. They differ only in the data structure used: using a stack (first in, last out) data structure for the pending set results in a depth-first traversal, while using a queue (first in, first out) data structure results in a breadth-first traversal.

The depth-first traversal method of decomposition 400 is illustrated in FIG. 4.

In this method, the routing tree is taken by value and modifications to the routing tree made in this method therefore do not affect the routing tree maintained by the worker once the method has been completed. In other words, this method is performed on a temporary copy of the routing tree.

In step 410, the worker begins traversing its routing tree at a first node (e.g., the root node) by determining whether the first node's associated region, in the worker's routing tree, overlaps with the target region in an overlap region.

If the first node's associated region does overlap with the target region, the worker determines, in step 420, whether the first node has any children.

If the first node does have at least one child, the worker removes one of the children from the node in the routing tree in step 430, subtracts, from the region associated with the first node in the routing tree, the region associated with that child node in the routing tree in step 440, and adds that child node to a pending stack of nodes to be traversed in step 450. The method then returns to step 410.

If the first node does not have any children in the routing tree, the worker adds, to an output set, a mapping from the overlap region (from step 410) to the worker associated with the first node.

If the first node's associated region does not overlap with the target region, the method proceeds straight to step 470.

In step 470, the worker determines whether the pending stack is empty.

If the pending stack is empty, the output set is complete, and the method ends. This output set can then be used in the methods of FIG. 2 or 3.

If the pending stack is not empty, the worker pops a node from the pending stack in step 480, and returns to step 410.

The breadth-first traversal method of decomposition 500 is illustrated in FIG. 5, and is similar to the method 400 of FIG. 4, with steps 510, 520, 530, 540 and 560 being the same as steps 410, 420, 430, 440, and 460, respectively.

However, in step S50, the child node is added to a pending queue of nodes to be traversed; in step S70, the worker determines whether the pending queue is empty; and in step S80, the worker pops a node from the pending queue. In other words, method 500 is the same as method 400, except that a pending queue is used instead of a pending stack.

Applications

The abstraction of the space away from the individual workers that implement it allows workers to send messages around the space without knowing about the other workers. Amongst other benefits, this allows local changes to be made to the tree structure without unrelated workers having to be aware of it. One useful application of this property is for work distribution: a worker that finds it has too much work to do can choose to 'split' some of its region onto new workers responsible for subregions of its original region, which become its children. Conversely, a worker that finds that some of its (leaf) children are significantly underloaded can choose to downsize and take back responsibility for their regions, an operation referred to as 'merging'. These operations may cause some cache entries to become invalid but due to the tree nature of routing will not cause messages to be dropped or delivered to the wrong workers, and the cache should eventually be corrected.

Splitting a Region

One of the core motivations for sending messages addressed to regions, rather than directly to workers, is that it allows the splitting of an overloaded worker responsible for a region into multiple workers responsible for subregions of that region.

Consider a space T, that has been partitioned into two subspaces $r_A$ and $r_B$. Call the workers responsible for $r_A$ and $r_B$ $W[r_A]$ and $W[r_B]$ respectively. Suppose further that during normal operation, $W[r_B]$ decides that it is overloaded, and requests that the region $r_B$ be split in two. Suppose that via some mechanism new workers $W[r_C]$ and $W[r_D]$ are made available, with the intention that $W[r_C]$ should be responsible for the region $r_C$ and $W[r_D]$ be responsible for the region $r_D$, with $r_C \cup r_D = r_B$.

As $W[r_B]$ will become the immediate parent of $W[r_C]$ and $W[r_D]$ after the split, it updates its own routing tree to include the $(r_C, W[r_C])$ and $(r_D, W[r_D])$ entries. This action should be atomic. At this point any inbound messages can be routed to $W[r_C]$ and $W[r_D]$ as appropriate based on the region the message is addressed to. Typically, it is expected that there will be some state transfer that needs to occur as part of the split. To facilitate this, $W[r_B]$ can send $W[r_C]$ and $W[r_D]$ a dedicated state transfer message $s\langle r_C \rangle$ and $s\langle r_D \rangle$, using the normal message sending mechanism. This message can encode the appropriate state required for $W[r_C]$ and $W[r_D]$ to take effective responsibility for $r_C$ and $r_D$, respectively.

There is a clear race here, as the routing tree has already been updated to mark $W[r_C]$ as responsible for $r_C$ and $W[r_D]$ as responsible for $r_D$, any messages that arrive to $W[r_C]$ or $W[r_D]$ before the state transfer message $s\langle r_C \rangle$ or $s\langle r_D \rangle$ may be unable to be processed. Consider for example $W[r_A]$ sending a message to some region $r_C$, which is a subregion of $r_C$. The routing tree at $W[r_A]$ will send a message $m\langle r_c \rangle$ which will either be sent directly to $W[r_C]$ if $W[r_A]$ has already gained knowledge of the split, or it will be sent to $W[r_B]$ (possibly via some other workers, e.g. $W[T]$), where $W[r_B]$ will decompose $r_C$ into $(r_C, W[r_C])$, and thus forward $m(r_C)$ to $W[r_C]$. It is for the implementation to ensure that this race condition is resolved appropriately, for example by buffering the incoming messages until the state transfer message can be processed.

Merging Subregions

Another advantage of addressing messages to regions is that underutilised workers can be merged into a single process that is responsible for a larger region, allowing the underutilised workers to return whatever resources they required, even in their underutilised state.

Consider a space T, that has been partitioned into two subspaces $r_A$ and $r_B$, and that $r_B$ has itself been partitioned into $r_C$ and $r_D$. Suppose that workers $W[T]$, $W[r_A]$, $w[r_B]$, $W[r_C]$ and $W[r_D]$ are responsible for T, $r_A$, $r_B$, $r_C$ and $r_D$ respectively. Suppose further that during normal processing $W[r_B]$ has identified that $W[r_C]$ and $W[r_D]$ are underutilised, and should be merged.

$W[r_B]$ may proceed by sending a merge message to $r_C$ and $r_D$ respectively, indicating that the workers $W[r_C]$ and $W[r_D]$ are no longer responsible for the regions $r_C$ and $r_D$ respectively, and that they should reject any new messages. $W[r_C]$ and $W[r_D]$ should also update their routing trees to remove the entry $(r_C, W[r_C])$ or $(r_D, W[r_D])$ respectively, and replace it with $(r_B, W[r_B])$. $W[r_B]$ can also update the routing tree to remove the entries $(r_C, W[r_C])$, and $(r_D, W[r_D])$ and add the entry $(r_B, W[r_B])$. This should all happen atomically.

To facilitate state transfer, $W[r_C]$ and $W[r_D]$ can send state transfer messages to $r_C$, and $r_D$ respectively. As the routing trees have been updated, when $W[r_C]$ decomposes $r_C$, it will find that $r_C$ is wholly contained in $r_B$, and thus generate the output set $(r_C, W[r_B])$. Similarly, $W[r_D]$ will generate the output set $(r_D, W[r_B])$. These messages can then be sent using the normal message sending mechanisms.

As with splitting, there is a race condition in which messages addressed to $r_B$ (or some subregion of it) cannot be processed until the state transfer messages have been processed. Consider for example $W[r_A]$ sends a message to $r_C$, which is a subregion of $r_C$ (and thus $r_B$). When decomposing the message $W[r_A]$ may already have the routing tree entry $(r_C, W[r_C])$, and so resolve the output set to be $(r_c, W[r_C])$. Upon sending the message $m\langle r_c \rangle$ to $W[r_C]$, $w[r_C]$ will report a failure (for reliable transmission). $W[r_A]$ then removes the $(r_C, W[T])$ entry from its routing tree, and re-decomposes $r_C$. Either this outputs an entry for some super region of $r_B$, for example $(r_C, W[T])$, or the output set is $(r_C, W[r_B])$. In either case, the message will eventually be sent to $W[r_B]$ (either directly, or via other workers), where $W[r_B]$ may not yet have processed the state transfer message. As with splitting a region, it is for the implementation to ensure that this condition is handled appropriately, for example by buffering messages to $r_B$ at $W[r_B]$ until the state transfer message has been processed.

EXAMPLES

These examples are provided to help provide a better understanding and intuition with the spatial partitioning tree, rather than acting as an authoritative description.

In the first two of these examples, a worker responsible for region $r_1$ wants to send a message m to the region $r_2 \cup r_3$. Responsibility for region $r_2 \cup r_3$ is divided: a worker that is a sibling to $r_1$ is responsible for $r_2$, but the closest common ancestor between $r_1$ and $r_3$ is the root node. The worker responsible for $r_3$ is also responsible for additional space, denoted $r_4$.

Workers will be referred to by the regions for which they are responsible, so in this case the worker labelled $r_1$ wishes to send a message to the worker labelled $r_2$ as well as to the worker labelled $r_3 \cup r_4$.

The message here is considered to be reliable. Unreliable messages are routed similarly, but each delivery step may fail or the implementation may choose to drop the message after a certain number of steps.

Figures 6A, 6B:
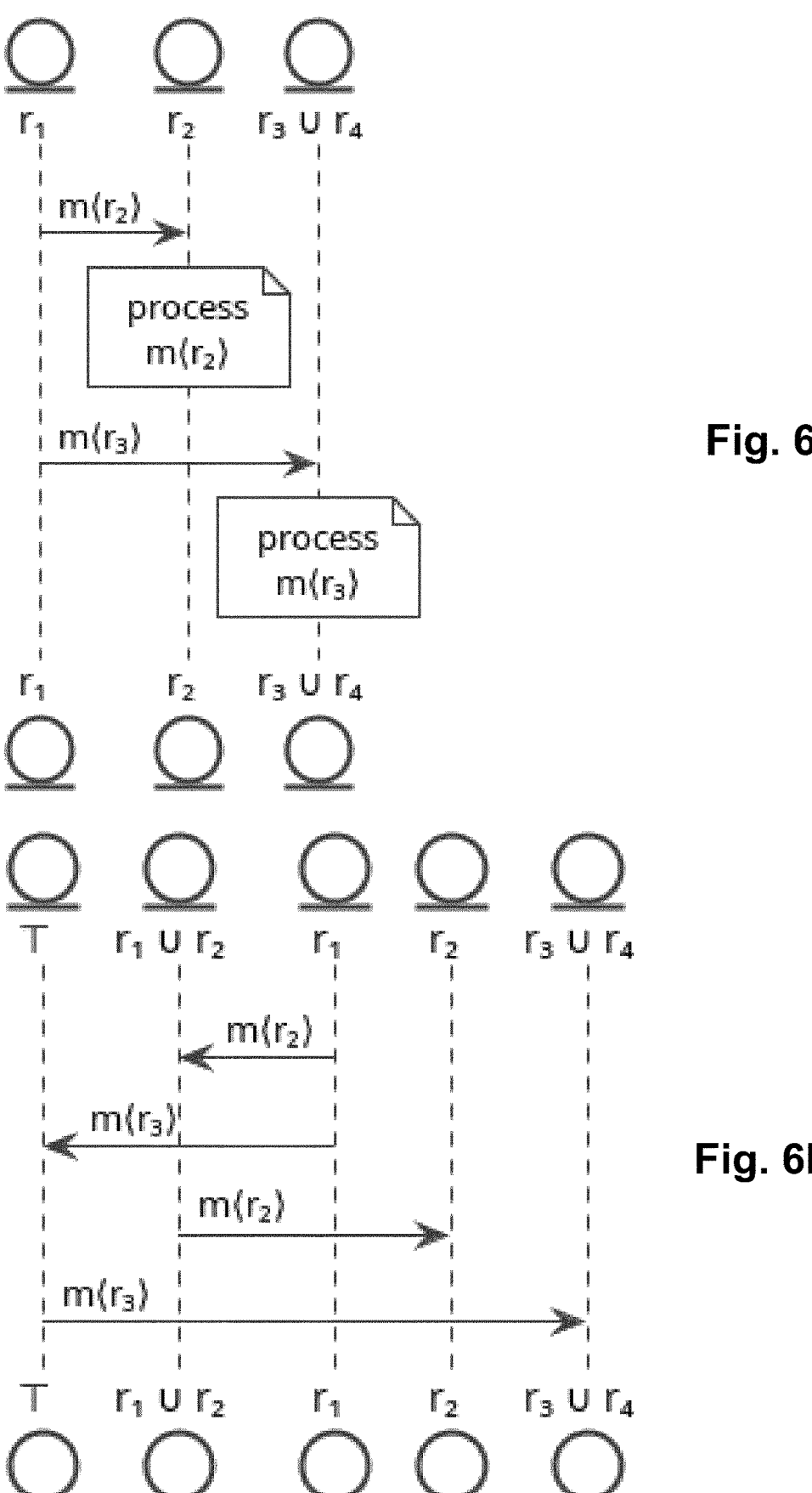
FIGS. 6*a* and 6*b* show sequence diagrams illustrating how the methods of communication between processes described herein can be applied in example scenarios.

In a first example, illustrated in FIG. 6a, the $r_1$ worker already knows about both $r_2$ and $r_3 \cup r_4$—its routing tree maps them to their workers. $r_1$ can message both $r_2$ and $r_3 \cup r_4$ directly.

In a second example, illustrated in FIG. 6b, the $r_1$ worker is trying to send a message to $r_2 \cup r_3$, but it does not know about the workers for $r_2$ or $r_3 \cup r_4$. The most specific owners of those regions it knows about are $r_1 \cup r_2$ and T, respectively, so it is to those workers that it delivers the message.

Notice that as a worker's ancestors do not change, the worst-case traversal starts from the common ancestor of the sender and receiver.

Figure 7A:
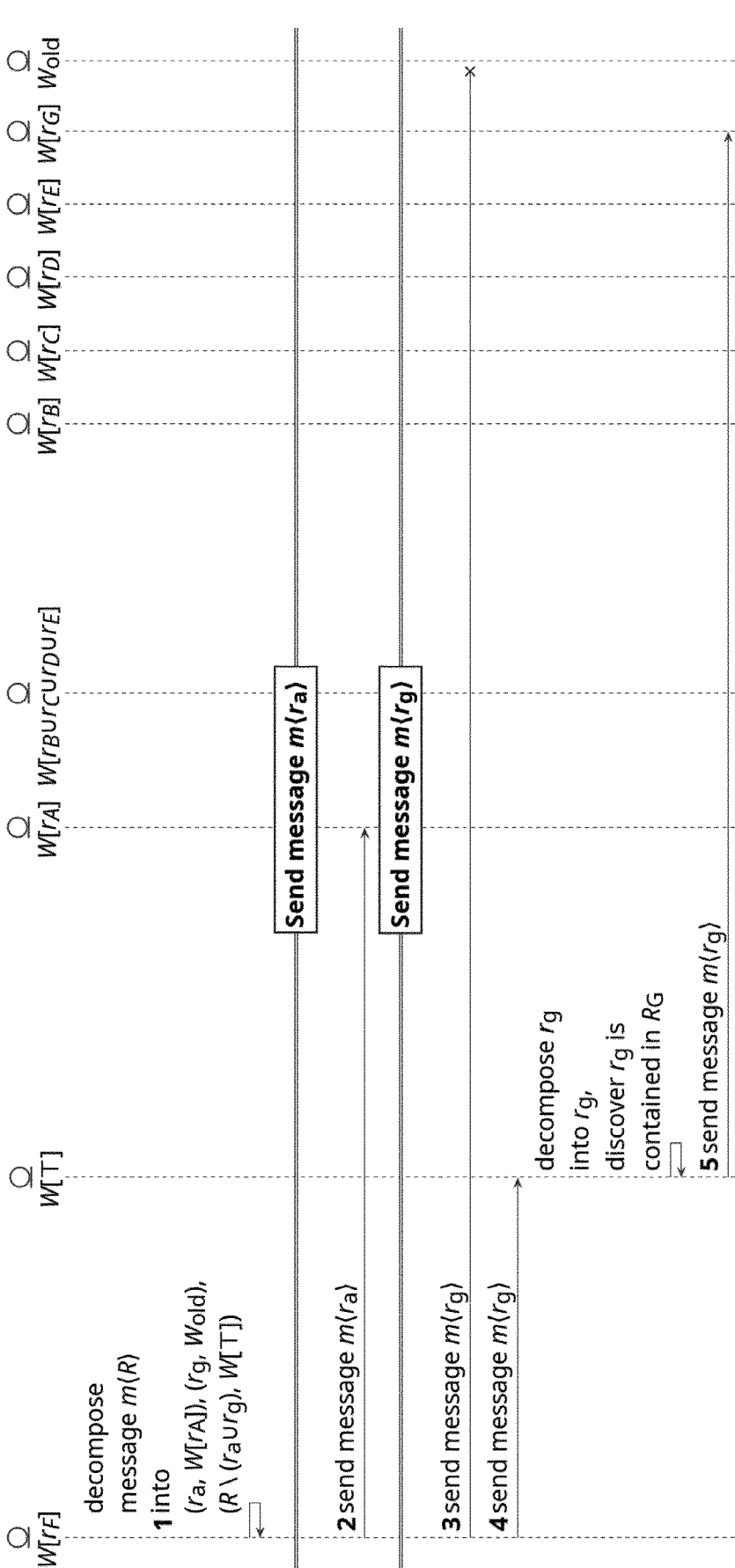
FIGS. 7*a* and 7*b* show a first and a second part of a sequence diagram illustrating how the methods of communication between processes described herein can be applied in an example scenario.
Figure 7B:
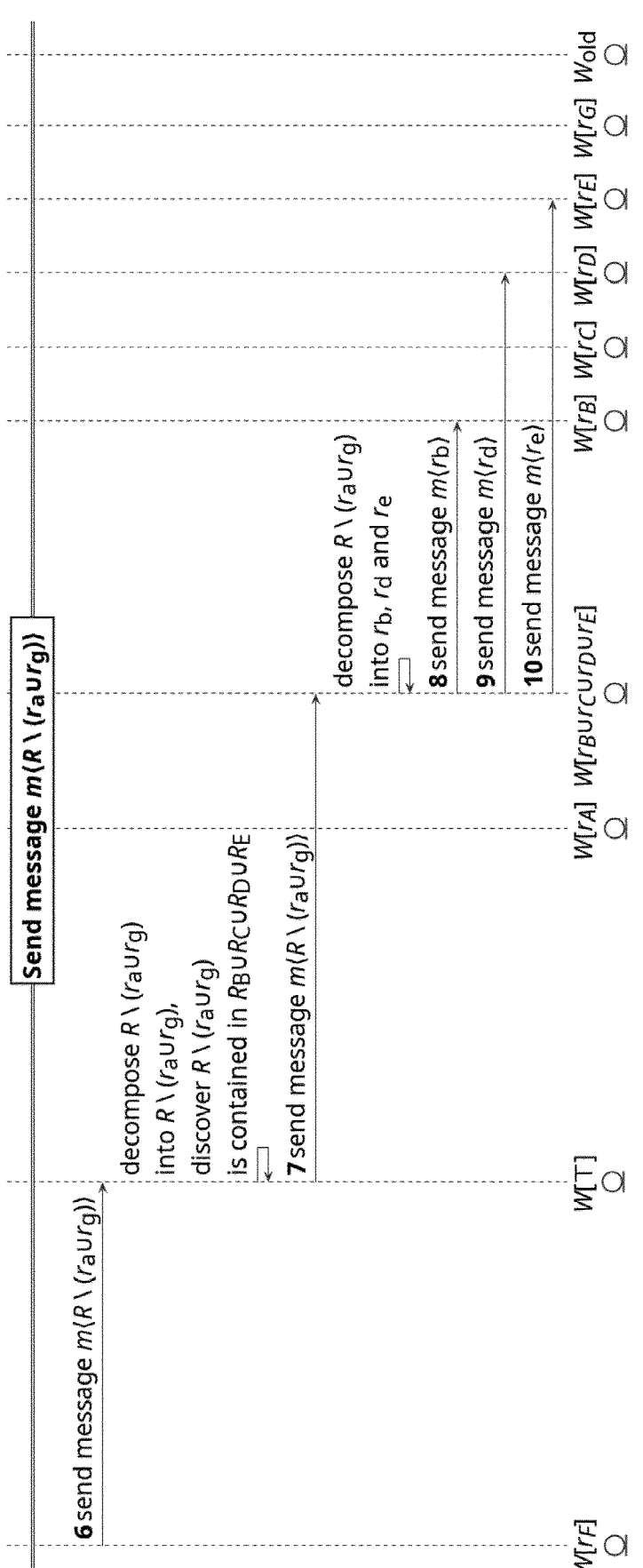

In a third example, illustrated in the sequence diagram of FIGS. 7a and 7b, suppose that a space has been partitioned first into $r_A$, $r_B \cup r_C \cup r_D \not\subseteq r_E$, $r_F$ and $r_G$, and that $r_B \cup r_C \cup r_D \cup r_E$ is itself partitioned into $r_B$, $r_C$, $r_D$ and $r_E$. Let the worker responsible for a region r be named $W[r]$. Particularly, note the existence of $W[T]$, which is responsible for the root region of the tree, T. Finally, suppose that at some point previously an additional worker $W_{old}$ had been assigned the region $r_G$, but that it no longer has responsibility for that region (by that worker having either exited/been terminated or migrated to be responsible for a different area).

Consider now that as part of normal operation, $W[r_F]$ wishes to send a message to a region R that overlaps $r_A$, $r_B$, $r_D$, $r_E$ and $r_G$. Denote the message being sent as $m\langle R \rangle$ (step 1). $W[r_F]$ proceeds by attempting to decompose the message according to the routing tree as available to $W[r_F]$. Consider the state of the routing tree to be that the invariants hold (i.e., the routing tree has a valid reference to $W[T]$), that the routing tree contains an entry $(r_A, W[r_A])$, and that the routing tree has a stale entry $(r_G, W_{old})$ By following the decomposition, the routing tree may produce the output set $\{(r_a, W[r_A]), (r_g, W_{old}), (R \setminus (r_a \cup r_g), W[[T]])\}$, where $r_a = R \cap r_A$ and $r_g = R \cap r_G$. The worker then proceeds to send the message to each of these decomposed regions.

First consider the message to $r_a$, which is believed to be owned entirely by $W[r_A]$. $W[r_F]$ can send the message $m\langle r_a \rangle$ to $W[r_A]$ (step 2). As $W[r_A]$ is responsible for $r_A$, upon receiving the message $W[r_A]$ can choose to acknowledge this message, and thus the send to $r_A$ is complete, and $r_a$ is removed from the target region R.

Second, consider the message to $r_g$, which is believed to be owned entirely by $W_{old}$. Call the message $m\langle r_g\rangle$. As $W_{old}$ either does not exist (and thus communication attempt fails) or is no longer responsible for $r_G$, and so responds with a rejection of the message, the send fails (step 3). As such $W[r_F]$ removes $W_{old}$ from the routing tree. It notes this failure from the routing tree entry being stale, and will later re-decompose $m\langle R\rangle$—with $r_a$ removed, as it has already been handled.

Thirdly, consider the message to $R\backslash(r_a\cup r_g)$. As the routing tree did not have any more specific reference to this region, it is resolved to $W[T]$. Denote the message as $m\langle R\backslash (r_a\cup r_g)\rangle$. sends the message to $W[T]$ (step 6), which does indeed cover $R\backslash(r_a\cup r_g)$ and is therefore able to report success. $W[T]$, being the root node, is able to discern that $R\backslash(r_a\cup r_g)$ is wholly covered by the region $r_B\cup r_C\cup r_D\cup r_E$, and thus forwards the message to $W[r_B\cup r_C\cup r_D\cup r_E]$ (step 7). $W[r_B\cup r_C\cup r_D\cup r_E]$ then decomposes the message, generating the output set $\{(r_b, W[r_B]), (r_d, W[r_D]), (r_e, W[r_E])\}$. It then proceeds to forward the decomposed messages $m\langle r_b\rangle$, $m\langle r_d\rangle$, and $m\langle r_e\rangle$ to $W[r_B]$ (step 8), $W[r_D]$, (step 9) and $W[r_E]$ (step 10) respectively. Thus $R\backslash(r_a\cup r_g)$ is removed from the target region R. Note that as $R\backslash(R\backslash(r_a\cup r_g))=(r_a\cup r_g)$, and $r_a$ had previously been removed, this reduces down to $r_g$ in this example. This is not required, and multiple send failures will cause this region to reduce to the union of the regions that the sends failed for.

Finally, as the message to $r_g$ has failed to send, the worker $W[r_F]$ re-decomposes R having removed the now-defunct reference to $W_{old}$. The output set may now be just $\{(r_g, W[T])\}$, and so $W[r_F]$ sends $m\langle r_g\rangle$ to $W[T]$ (step 4), which can itself decompose the message, finding that $r_G$ fully contains $r_g$ and thus that $m\langle r_g\rangle$ can be forwarded to $W[r_G]$ (step 5). Finally $W[r_G]$ can report success to $W[T]$, which in turn can report success to $W[r_F]$. Thus the message is sent completely to R.

Figure 7C:
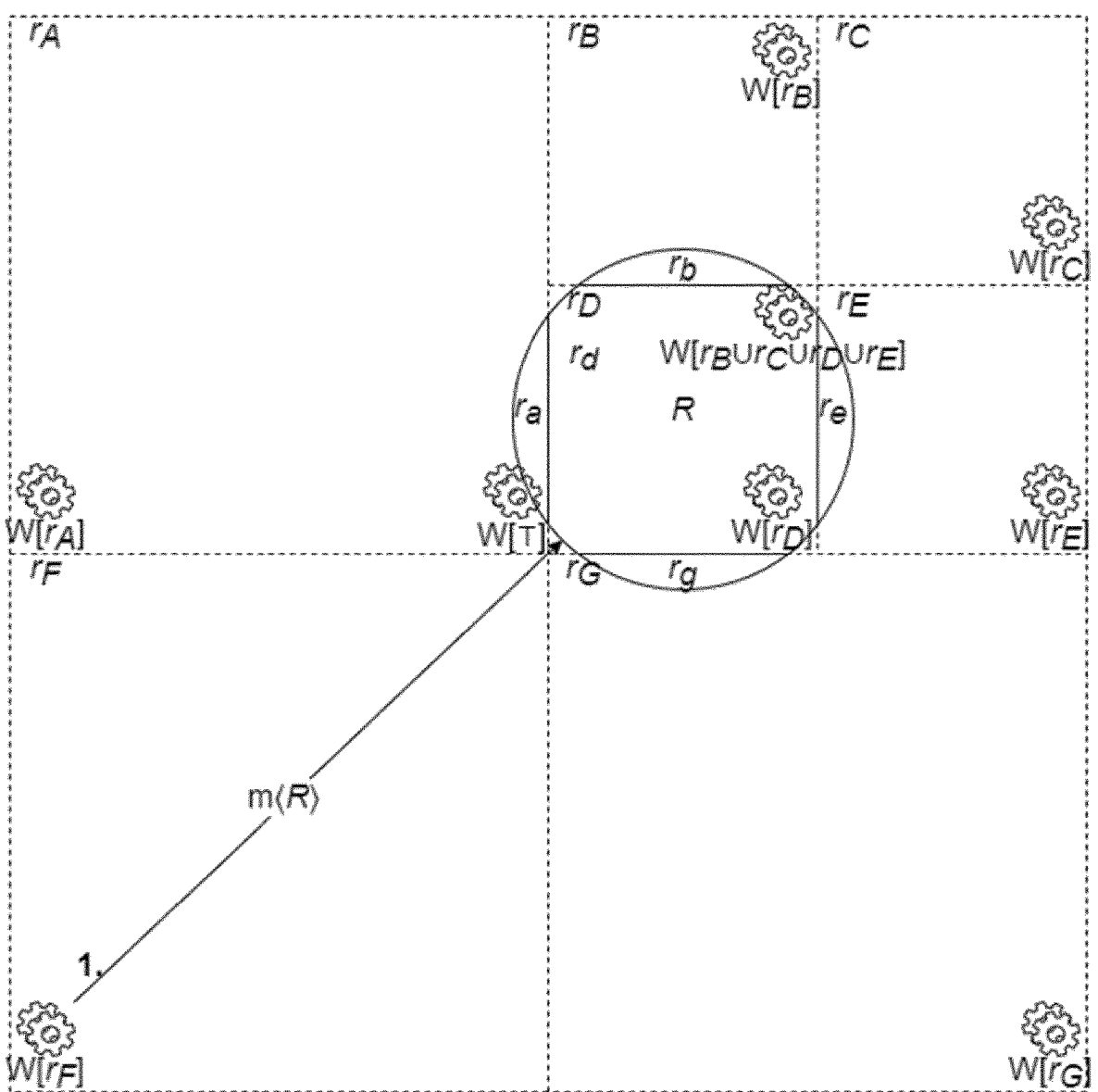
FIGS. 7*c*, 7*d* and 7*e* show representations of regions and processes of the example scenario of FIGS. 7*a* and 7*b*.
Figure 7D:
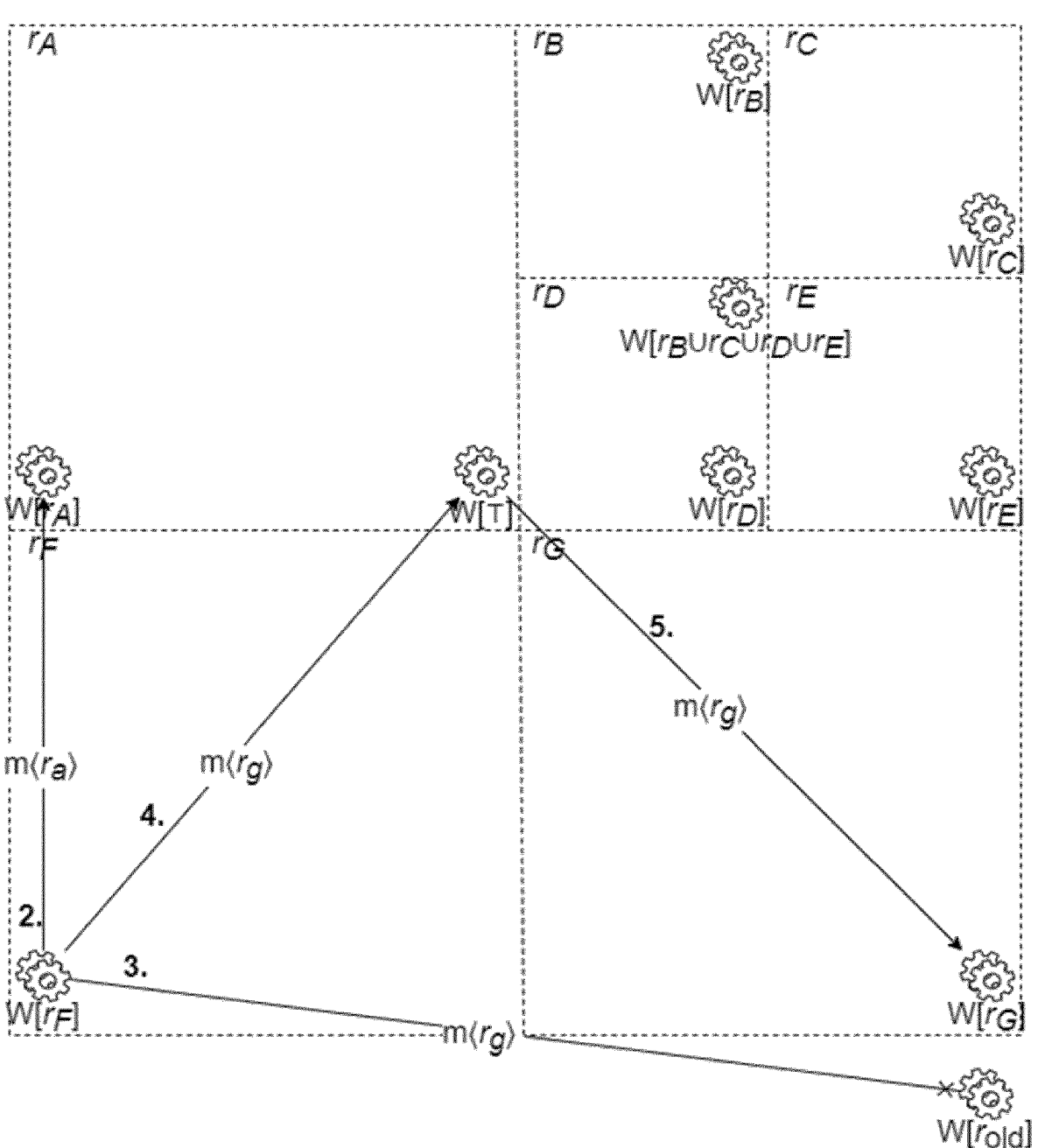
Figure 7E:
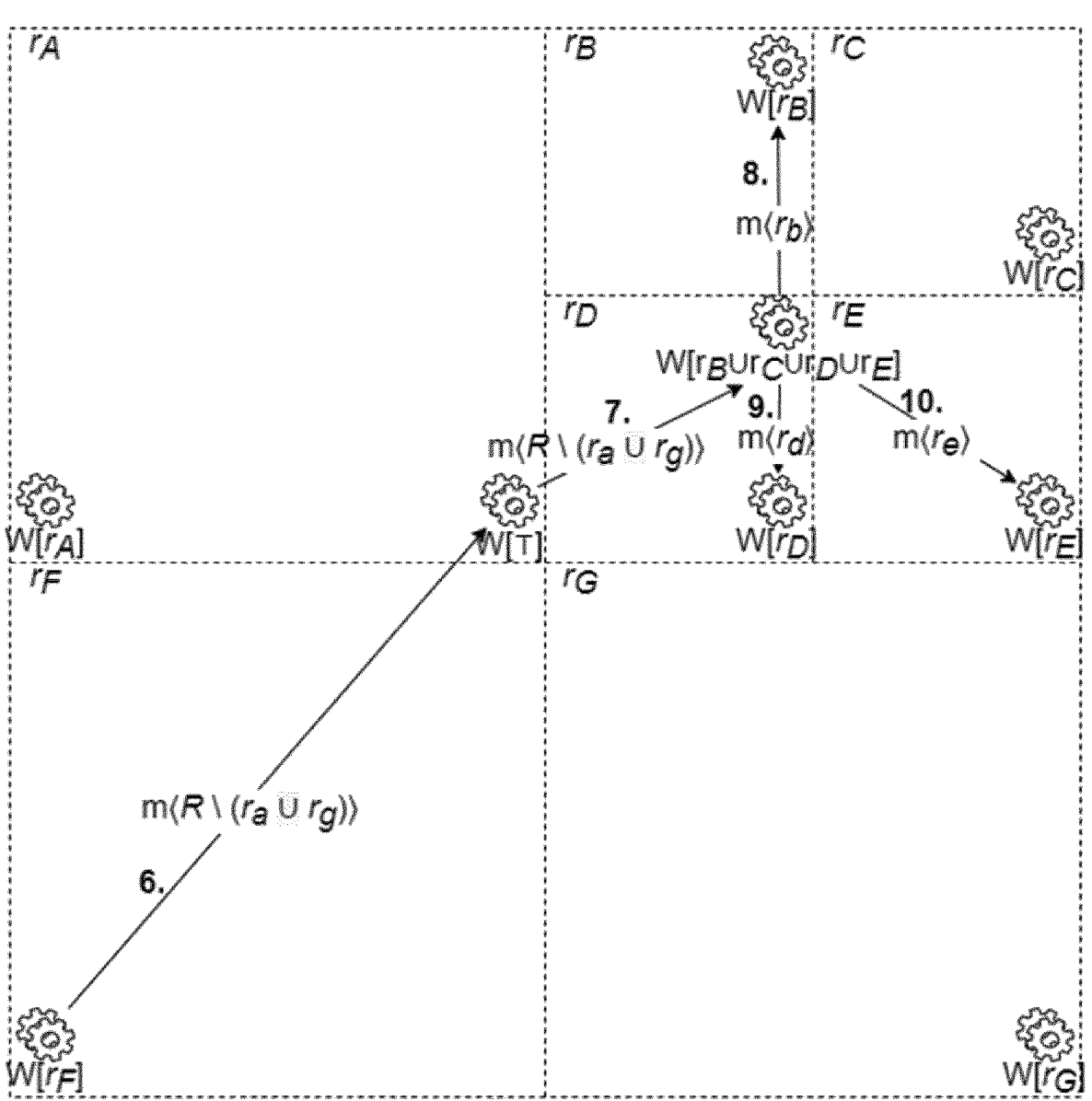

In order to explain the region decomposition involved in FIGS. 7a and 7b, the following examples present a version of the above flow as mapped to a subset of the $R^2$ plane, illustrated in FIGS. 7c, 7d and 7e. Taking again the same setup as in FIGS. 7a and 7b, the region decomposition required at each step is now considered.

Decomposition of R into $(r_a, W[r_A])$, $(r_g, W_{old})$ and $(R\backslash (r_a\cup r_g), W[T])$ at $W[r_F]$ Recall that according to the original setup, the worker $W[r_F]$ has a routing tree that contains the following entries:

(T, W[T])

$(r_F, W[r_F])$ $(r_A, W[r_A])$ $(r_G, W_{old})$

When considering the message $m\langle R\rangle$, $W[r_F]$ may proceed by considering the entry $(r_A, W[r_A])$ first. As $r_A\cap R\neq\perp$, it can be seen that some part of R belongs to $r_A$, and so this region is named $r_a$. In the case of the example above, this region could be reified by defining it as $r_a\equiv\{p|p\in r_A$ and $p\in R\}$. As $r_a$ is found to be non-empty, it can be added to the output set. $r_a$ can also be removed from R for the rest of the decomposition, effectively redefining R to be $R\backslash r_a$, for clarity call this R'.

Next the entry $(r_G, W_{old})$ can be considered. As again $r_G\cap R'\neq\perp$, $r_g$ can be defined similarly to $r_a$, and $(r_g, W_{old})$ can be added to the output set. And as with $r_a$, $r_g$ can be removed from R', so now R' is effectively $R'\backslash r_g$, call this R", and observe that now $R"R\backslash(r_a\cup r_g)$).

Next $(r_F, W[r_F])$, which is the region $W[r_F]$ is itself responsible for, can be considered. As now it is found that $r_F\cap R"\equiv\perp$, $W[r_F]$ is not added to the output set.

Finally the (T, W[T]) entry is considered. As T is the entire space, then it follows that $T\cap R"\equiv R"$. Thus $w(R", W[T])$ can be added to the output set, and R'" can be defined as $R"\backslash R"$, which is $\perp$, and so the decomposition at $W[r_F]$ is complete.

As a result of this process, the output set contains:

$(r_a, W[r_A])$ $(r_g, W_{old})$ $(R", W[T])\equiv(R\backslash(r_a\cup r_g), W[T])$ Note that the order in which the entries of the routing tree are considered affected the results set. Had the (T, W[T]) entry been considered first, the output set could simply have been (R, W[T]). Although this would be a valid output set and the rest of the message send would work, it is potentially an inefficient route to send this message. As such, the suggested procedure above prefers to analyse child nodes first by doing a depth-first traversal of the routing tree.

Decomposition of $R\backslash(r_a\cup r_g)$ into $R\backslash(r_a\cup r_g)$, $W[r_B\cup r_C\cup r_D\cup r_E]$ at $W[T]$ As the invariants required of the routing tree state that it should at each node contain valid references to the immediate children of that region, $W[T]$ should contain at least the following entries in the routing tree:

(T, W[T])

$(r_A, W[r_A])$ $(r_B\cup r_G\cup r_D\cup r_E, W[r_B\cup r_G\cup r_D\cup r_E])$ $(r_F, W[r_F])$ $(r_G, W[r_G])$ It is of course possible that the routing tree could also contain entries for $r_B$, $r_C$, $r_D$ and $r_E$, although it is supposed not for this example.

Consider first the $(r_G, W[r_G])$ entry. As $R\backslash\cup r_g)\cap r_G=\perp$, $W[T]$ does not include $W[r_G]$ in the output set, and instead defines R' to be $(R\backslash(r_a\cup r_g))\backslash r_G$, which is $R\backslash(r_a\cup r_g)$.

Reasoning for the $(r_A, W[r_A])$ and $(r_F, W[r_F])$ entries proceeds similarly, where the decomposition finds that $R'\cap r_A\equiv\perp$, and $R'\cap r_F\equiv\forall$. As such neither $W[r_A]$ nor $W[r_F]$ are added to the output set, and $r_A$ and $r_G$ are removed from R', giving $R"=R'\backslash r_A\backslash r_F\equiv R'$.

Next, consider the $(r_B\cup r_C\cup r_D\cup r_E, W[r_B\cup r_C\cup r_D\cup r_E])$ entry. Here $R"\cap r_B\cup r_C\cup r_D\cup r_E\neq\perp$, so define $r_b\cup r_c\cup r_d\cup r_e.=R$ n $r_B\cup r_C\cup r_D\cup r_E$, and $W[T]$ adds $(r_b\cup r_e\cup r_d\cup r_e, W[r_B\cup r_C\cup r_D\cup r_E])$ to the output set, and removes $r_B\cup r_C\cup r_D\cup r_E$ from R", generating R'". As R'" is now empty (by virtue of $R\backslash r_a\backslash r_g\backslash r_b\cup r_e\cup r_d\cup r_e$ being empty), the output set is complete, and contains the following entries:

$(r_b\cup r_c\cup r_d\cup r_e, W[r_B\cup r_c\cup r_D\cup r_E])$

And so $W[T]$ can forward $m<r_b\cup r_c\cup r_d\cup r_e>$ to $W[r_B\cup r_C\cup r_D\cup r_E]$.

Decomposition of $r_b\cup r_c\cup r_d\cup r_e$ into $(r_b, W[r_B])$, $(r_d, W[r_d])$ and $(r_e, W[r_e])$ at $W[r_B\cup r_C\cup r_D\cup r_E]$ As the invariants required of the routing tree state that it should at each node contain valid references to the immediate children of that region, $W[r_B\cup r_C\cup r_D\cup r_E]$ should contain at least the following entries in the routing tree:

(T, W[T])

$(r_B\cup r_C\cup r_D\cup r_E, W[r_B\cup r_C\cup r_D\cup r_E])$ $(r_B, W[r_B])$ $(r_C, W[r_d])$ $(r_D, W[r_D])$ $(r_E, W[r_E])$ This proceeds similarly to the previous sections. Consider the $(r_E, W[r_E])$ entry. As $r_b \cup r_c \cup r_d \cup r_e \cap r_E \neq \perp$ (indeed $r_b \cup r_c \cup r_d \cup r_e \cap r_E = r_e$), $W[r_B \cup r_C \cup r_D \cup r_E]$ can add $(r_e, W[r_E])$ to the output set, and remove $r_e$ from $r_b \cup r_c \cup r_d \cup r_e$, generating R'.

Next consider $(r_D, W[r_D])$. As $R' \cap r_D \neq \perp$ (indeed, $R' \cap r_D = r_d$), $W[r_B \cup r_C \cup r_D \cup r_E]$ can add $(r_d, W[r_D])$ to the output set, and remove $r_d$ from R', generating R".

Next consider $(r_C, W[r_C])$. As $R'' \cap r_C = \perp$, $W[r_B \cup r_C \cup r_D \cup r_E]$ does not add $W[r_C]$ to the output set, and removes $r_C$ from R", generating $R''' \equiv R''$.

Next consider $(r_B, W[r_B])$. As $R''' \cap r_B \neq \perp$ (indeed, $R''' \cap r_B = r_b$), $W[r_B \cup r_C \cup r_D \cup r_E]$ can add $(r_b, W[r_B])$ to the output set and remove $r_b$ from R'", generating R'''. As at this point $R'''' \equiv \perp$, the output set is complete and contains the following entries:

$(r_e, W[r_C])$ $(r_d, W[r_C])$ $(r_b, W[r_C])$

And so $W[r_B \cup r_C \cup r_D \cup r_E]$ can send $m\langle r_e \rangle$ to $W[r_E]$, $m\langle r_d \rangle$ to $W[r_D]$, and $m\langle r_b \rangle$ to $W[r_B]$.

In some implementations, the various methods described above are implemented by a computer program. In some implementations, the computer program includes computer code arranged to instruct a computer to perform the functions of one or more of the various methods described above. In some implementations, the computer program and/or the code for performing such methods is provided to an apparatus, such as a computer, on one or more computer-readable media or, more generally, a computer program product. The computer-readable media is transitory or non-transitory. The one or more computer-readable media could be, for example, an electronic, magnetic, optical, electromagnetic, infrared, or semiconductor system, or a propagation medium for data transmission, for example for downloading the code over the Internet. Alternatively, the one or more computer-readable media could take the form of one or more physical computer-readable media such as semiconductor or solid state memory, magnetic tape, a removable computer diskette, a random access memory (RAM), a read-only memory (ROM), a rigid magnetic disc, or an optical disk, such as a CD-ROM, CD-R/W or DVD.

In an implementation, the modules, components and other features described herein are implemented as discrete components or integrated in the functionality of hardware components such as ASICS, FPGAs, DSPs or similar devices.

A 'hardware component' is a tangible (e.g., non-transitory) physical component (e.g., a set of one or more processors) capable of performing certain operations and configured or arranged in a certain physical manner. In some implementations, a hardware component includes dedicated circuitry or logic that is permanently configured to perform certain operations. In some implementations, a hardware component is or includes a special-purpose processor, such as a field programmable gate array (FPGA) or an ASIC. In some implementations, a hardware component also includes programmable logic or circuitry that is temporarily configured by software to perform certain operations.

Accordingly, the term 'hardware component' should be understood to encompass a tangible entity that is physically constructed, permanently configured (e.g., hardwired), or temporarily configured (e.g., programmed) to operate in a certain manner or to perform certain operations described herein.

In addition, in some implementations, the modules and components are implemented as firmware or functional circuitry within hardware devices. Further, in some implementations, the modules and components are implemented in any combination of hardware devices and software components, or only in software (e.g., code stored or otherwise embodied in a machine-readable medium or in a transmission medium).

Those skilled in the art will recognise that a wide variety of modifications, alterations, and combinations can be made with respect to the above described examples without departing from the scope of the disclosed concepts, and that such modifications, alterations, and combinations are to be viewed as being within the scope of the present disclosure.

In particular, although various features of the approach of the present disclosure have been presented separately (e.g., in separate flowcharts), the skilled person will understand that, unless they are presented as mutually exclusive (e.g., using the term "alternatively"), they may all be combined. For example, any of the features disclosed herein can be combined with the features of FIG. 2, any features of either of FIGS. 4 and 5 can be combined with the features of FIG. 2 or 3, and any features of the examples of FIGS. 6a, 6b, 7a, 7b, 7c, 7d and 7e can be applied to the methods of FIG. 2, 3, 4 or 5.

It will be appreciated that, although various approaches above may be implicitly or explicitly described as optimal, engineering involves trade-offs and so an approach which is optimal from one perspective may not be optimal from another. Furthermore, approaches which are slightly suboptimal may nevertheless be useful. As a result, both optimal and sub-optimal solutions should be considered as being within the scope of the present disclosure.

It will be appreciated that the steps of the methods described herein may be performed concurrently. For example, the sending of step S230 may be performed concurrently for at least two determined subregions, and the steps of FIGS. 4 and 5 may be performed concurrently for each of a node's children. Unless otherwise indicated (either explicitly or due to the dependencies of a particular step), the steps of the methods described herein may be performed in any order.

Those skilled in the art will also recognise that the scope of the invention is not limited by the examples described herein, but is instead defined by the appended claims.

The invention claimed is:

1. A computer-implemented method of communication between a plurality of processes, each process being responsible for a region of a space, and each process maintaining a routing tree, each node of the routing tree representing a respective one of the plurality of processes and containing an indication of the represented process and an indication of an associated region for which the represented process is responsible, the method comprising:

a) receiving, by a first process, a message addressed to a target region of the space;

b) determining, by the first process and using the routing tree of the first process, a set of subregions of the target region and processes associated with the subregions; and c) for each of the determined subregions in the set, sending the message from the first process to the process associated with the determined subregion in the set.

2. The method of claim 1, wherein the determining comprises traversing the routing tree of the first process until the subregions in the set cumulatively cover the target region, the traversing comprising, for each of a plurality of traversed nodes in the routing tree:

determining a subregion based on at least the region associated with the traversed node in the routing tree, and adding, to the set, the subregion and the process associated with the traversed node in the routing tree.

3. The method of claim 1, wherein the determining comprises traversing the routing tree of the first process until the subregions in the set cumulatively cover the target region, the traversing comprising, for each of a plurality of traversed nodes in the routing tree:

if the traversed node has one or more children in the routing tree, determining whether, after subtracting the regions associated with each of the one or more children in the routing tree, the target region and the region associated with the traversed node in the routing tree overlap in an overlap region, otherwise, determining whether the target region and the region associated with the traversed node in the routing tree overlap in an overlap region, and responsive to determining that the target region and the region associated with the traversed node in the routing tree overlap, adding, to the set, the overlap region and the process associated with the traversed node in the routing tree.

4. The method of claim 1, wherein the determining comprises traversing the routing tree of the first process, the traversing comprising, for each of a plurality of traversed nodes in the routing tree:

determining whether the target region and the region associated with the traversed node in the routing tree overlap; and responsive to determining that the target region and the region associated with the traversed node in the routing tree do not overlap, refraining from traversing any child nodes of the traversed node in the routing tree.

5. The method of claim 1, further comprising, for each of the determined subregions in the set, determining whether a failure has been detected in transporting the message to the process associated with the determined subregion.

6. The method of claim 5, further comprising, for each of the determined subregions in the set, responsive to determining that a failure has been detected in transporting the message to the process associated with the determined subregion, removing the node associated with the determined subregion from the routing tree.

7. The method of claim 5, further comprising, d) for each of the determined subregions in the set, responsive to determining that no failure has been detected in transporting the message to the process associated with the determined subregion, subtracting the determined subregion from the target region; and optionally, repeating steps b), c) and d) until the target region is empty.

8. The method of claim 1, wherein the message addressed to the target region is received from another process.

9. The method of claim 8, wherein the target region and the region associated with the first process do not overlap.

10. The method of claim 1, wherein sending the message to the process associated with the determined subregion comprises:

altering the message according to the determined subregion; and sending the altered message to the process associated with the determined subregion.

11. The method of claim 1, wherein the first process is represented by a first node in the routing tree of the first process, the method further comprising:

determining, by the first process, that the first process is overloaded; and responsive to determining that the first process is overloaded:

partitioning at least a portion of the region for which the first process is responsible into a plurality of disjoint subregions;

creating, by the first process, a plurality of child processes of the first process each responsible for a respective one of the plurality of disjoint subregions;

adding, to the routing tree of the first process, a plurality of child nodes of the first node, each of the child nodes containing an indication of one of the child processes and an indication of a corresponding one of the plurality of disjoint subregions for which the one of the child processes is responsible.

12. The method of claim 1, further comprising:

receiving, by the first process, an indication that at least one child process of the first process is underloaded; and responsive to the receiving of the indication that the at least one child process of the first process is underloaded:

sending a termination signal to the at least one child process, and removing, from the routing tree of the first process, the at least one child node representing the at least one child process.

13. A non-transitory computer-readable medium comprising instructions which, when executed by one or more computers, cause the one or more computers to perform a method of communication between a plurality of processes, each process being responsible for a region of a space, and each process maintaining a routing tree, each node of the routing tree representing a respective one of the plurality of processes and containing an indication of the represented process and an indication of an associated region for which the represented process is responsible, the method comprising:

a) receiving, by a first process, a message addressed to a target region of the space;

b) determining, by the first process and using the routing tree of the first process, a set of subregions of the target region and processes associated with the subregions; and c) for each of the determined subregions in the set, sending the message from the first process to the process associated with the determined subregion in the set.

14. A computer system comprising at least one processor configured to perform a method of:

communication between a plurality of processes, each process being responsible for a region of a space, and each process maintaining a routing tree, each node of the routing tree representing a respective one of the plurality of processes and containing an indication of the represented process and an indication of an associated region for which the represented process is responsible, the method comprising:

a) receiving, by a first process, a message addressed to a target region of the space;

b) determining, by the first process and using the routing tree of the first process, a set of subregions of the target region and processes associated with the subregions; and c) for each of the determined subregions in the set, sending the message from the first process to the process associated with the determined subregion in the set.

15. The method of claim 11, further comprising communicating, by the first process to at least one other process, an indication that the plurality of child processes have been created by the first process and an indication of the plurality of disjoint subregions for which the plurality of child processes are responsible.

16. The method of claim 1, wherein the space is a two-dimensional space partitioned into quadrants, a three-dimensional space partitioned into octants, or a space of three or more dimensions lying on a two-dimensional plane partitioned into quadrants.

17. The method of claim 1, wherein the target region and the indications of the associated regions in the routing tree of the first process are encoded using fixed-width coordinates on a space-filling curve.

18. The method of claim 1, further comprising:

receiving, by the first process from a second process, an indication that a plurality of child processes of the second process have been created by the second process and an indication of a plurality of disjoint subregions for which the plurality of child processes are responsible; and based on the receiving, updating the routing tree of the first process.

\* \* \* \* \*